(12) United States Patent  
Suzuki

(10) Patent No.: US 6,529,479 B1
(45) Date of Patent: Mar. 4, 2003

(54) SVC ACCESSING METHOD FOR USE IN ATM-DSLAM

(75) Inventor: Hiroyuki Suzuki, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/175,201

(22) Filed: Oct. 20, 1998

(30) Foreign Application Priority Data

Mar. 19, 1998 (JP) .......................................... 10-070113

(51) Int. Cl.⁷ .......................... H04L 12/56; H04L 12/66
(52) U.S. Cl. .............................. 370/236.1; 370/236.2; 370/395.52; 370/397; 370/401; 370/409
(58) Field of Search .............................. 370/230, 230.1, 370/231, 235, 236, 236.1, 236.2, 241.1, 352, 395.1, 396, 397, 395.5, 395.52, 395.53, 400, 401, 409, 410

(56) References Cited

U.S. PATENT DOCUMENTS 5,737,312 A * 4/1998 Sasagawa ................... 370/232
6,028,867 A * 2/2000 Rawson et al. ............. 370/463
6,075,784 A * 6/2000 Frankel et al. .............. 370/356
6,081,517 A * 6/2000 Liu et al. .................... 370/352
6,084,881 A * 7/2000 Fosmark et al. ............ 370/397
6,141,339 A * 10/2000 Kaplan et al. .............. 370/352
6,272,107 B1 * 8/2001 Rochberger et al. ........ 370/216
6,349,096 B1 * 2/2002 Liu et al. .................... 370/352

FOREIGN PATENT DOCUMENTS

JP  9-107359  4/1997
JP  9-149032  6/1997

OTHER PUBLICATIONS

Hamzeh et al.; "Point–to–Point Tunneling Protocol—PPTP"; 7/97; pp. 1–47.

* cited by examiner

Primary Examiner—Alpus H. Hsu
(74) Attorney, Agent, or Firm—Katten Muchin Zavis Rosenman

(57) ABSTRACT

An access server and a DSLAM are continuously connected by a PVC. The access server and the DSLAM manage an unused ATM VC within the PVC while making a communication with an idle VC indication cell which is an OAM cell. The DSLAM allocates the unused ATM VC by communicating with the access server based on a call originating request issued from a modem.

14 Claims, 21 Drawing Sheets

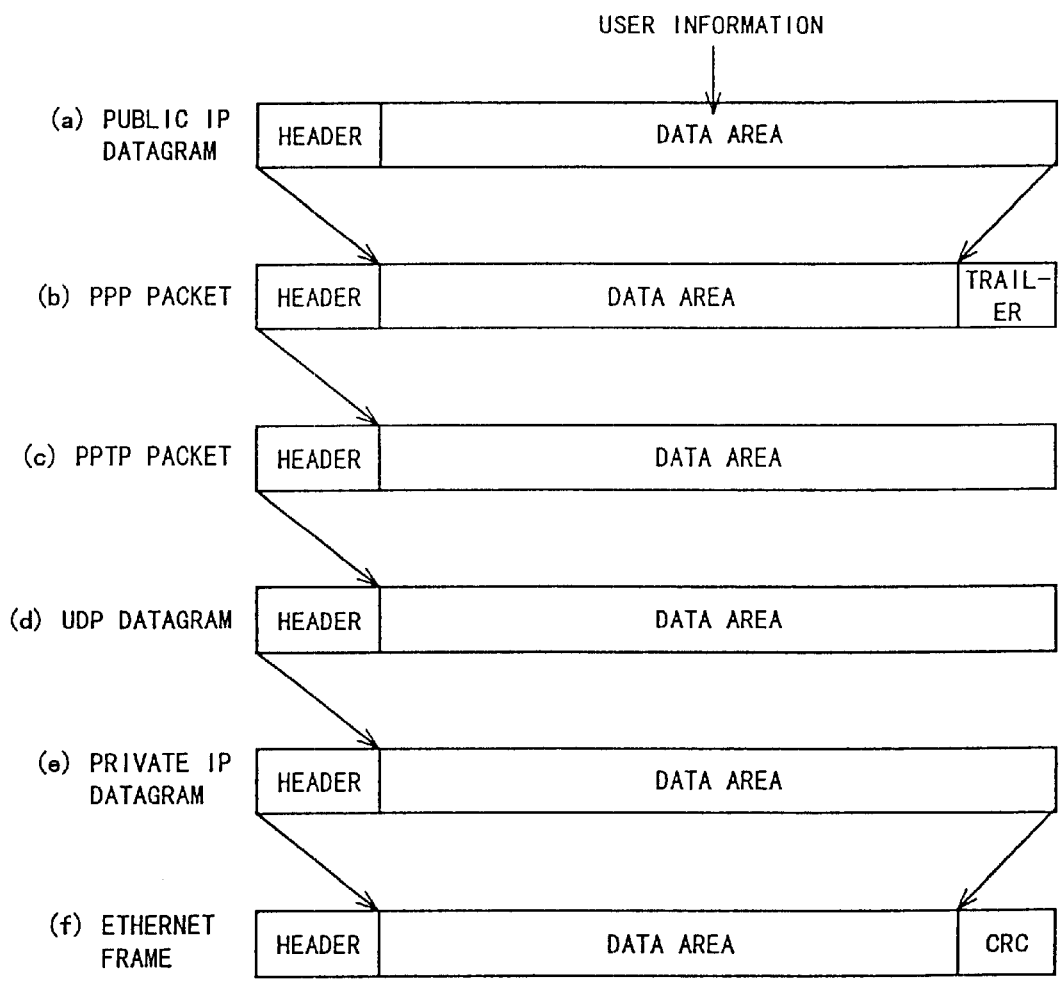
F I G. 4

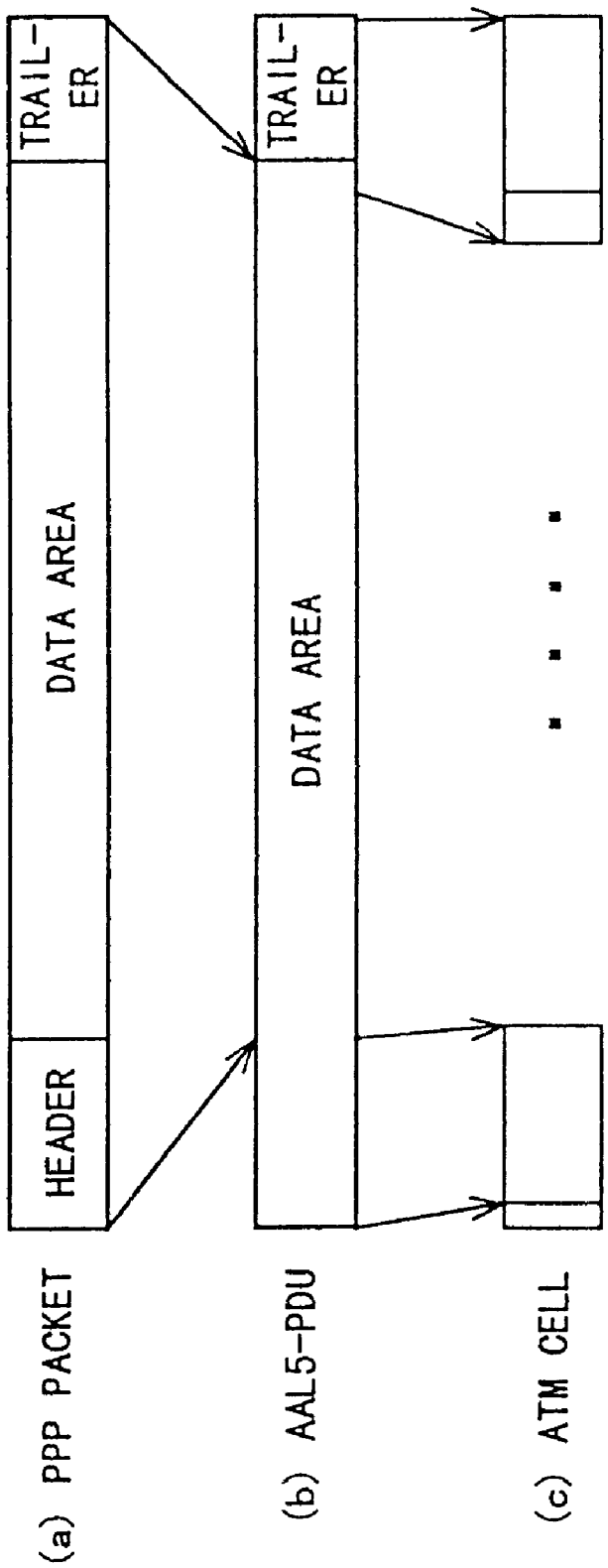
F I G. 6

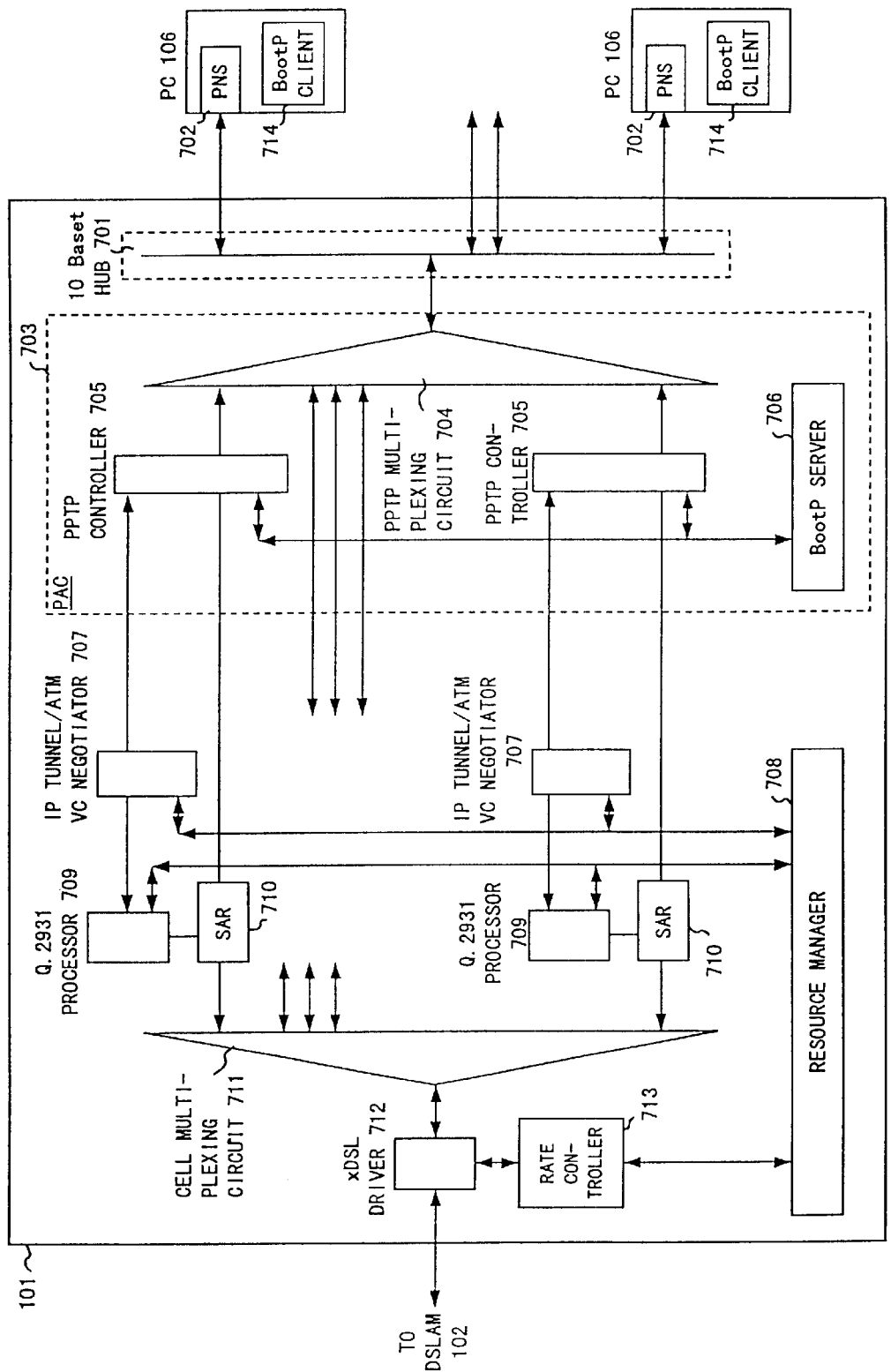
F I G. 8

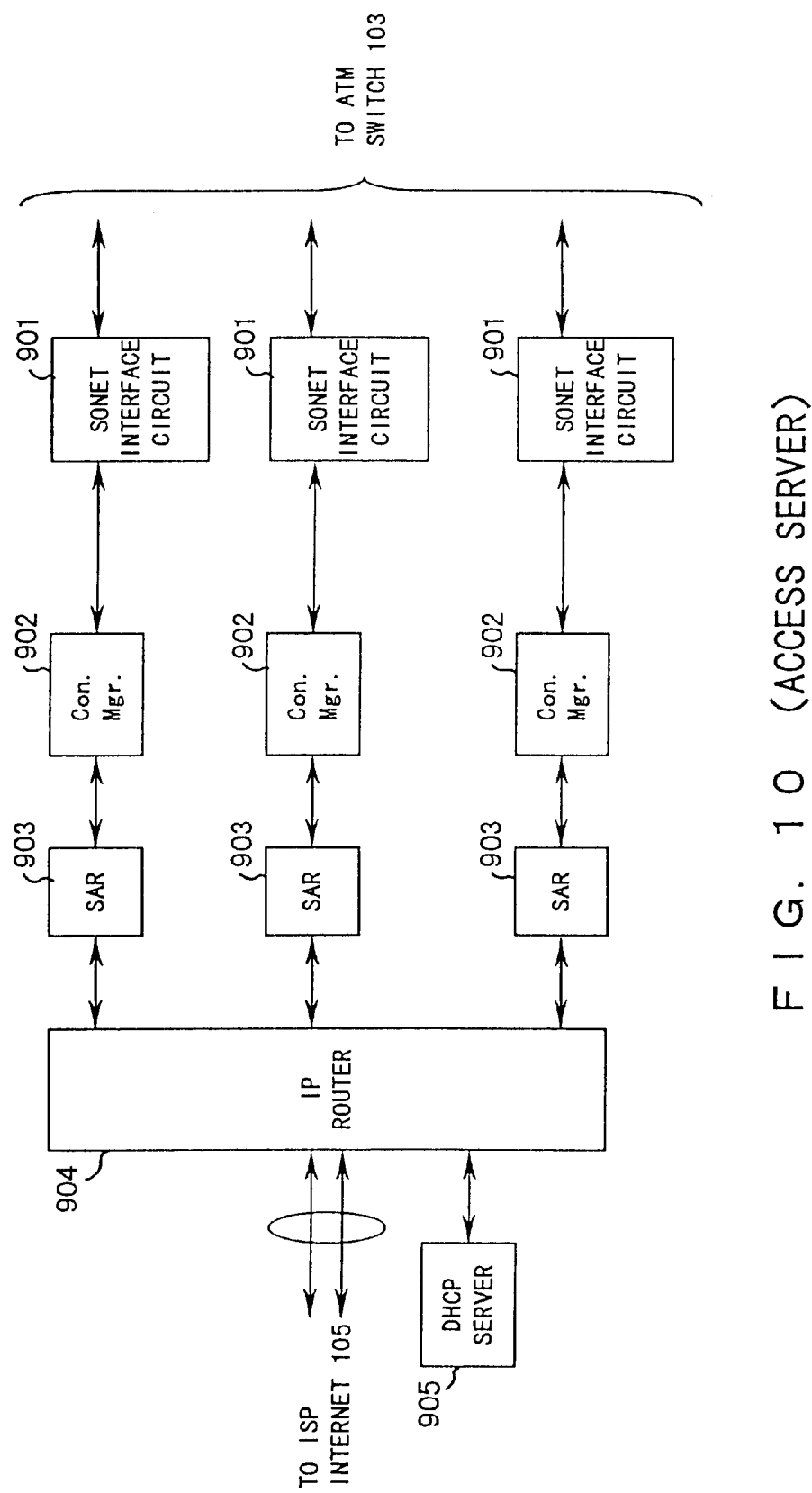
FIG. 10 (ACCESS SERVER)

| |
|---|
| CELL HEADER |
| – VPI ; ARBITRARY |
| – VCI ; ARBITRARY |
| – PAYLOAD TYPE ; 111 |
| – (OMITTED) |
| AAL (AAL – 5) |
| PAYLOAD |
| · CELL TYPE IDENTIFIER (1 Octet)<br>– IDLE VC INDICATION CELL (0000 0001)<br>– CONNECTION CONFIRM CELL (0000 0002)<br>– CONNECTION CONFIRM REPLY CELL (0000 0003)<br>– CONNECTION GET CELL (0000 0004)<br>– CONNECTION RELEASE CELL (0000 0005)<br>– (OMITTED) |
| · CELL TYPE SUB-IDENTIFIER (1 Octet)<br>– PAYLOAD UNUSED (0000 0001)<br>– NETWORK MAP UPDATE DATA (0000 0000)<br>– (OMITTED) |
| · INFORMATION (45 Octet)<br>– CPE ATM ADDRESS<br>– VC ID (VPI/VCI)<br>– (OMITTED) |

FIG. 11

| ATM VC ID | | | | | | |
|---|---|---|---|---|---|---|
| # NW Port# | STS CH# | VPI# | VCI# | ATM Address | ISP ID | Status |
| 1 | | | | | | |
| 2 | | | | | | |
| 3 | | | | | | |
| 100 | | | | | | |

FIG. 12

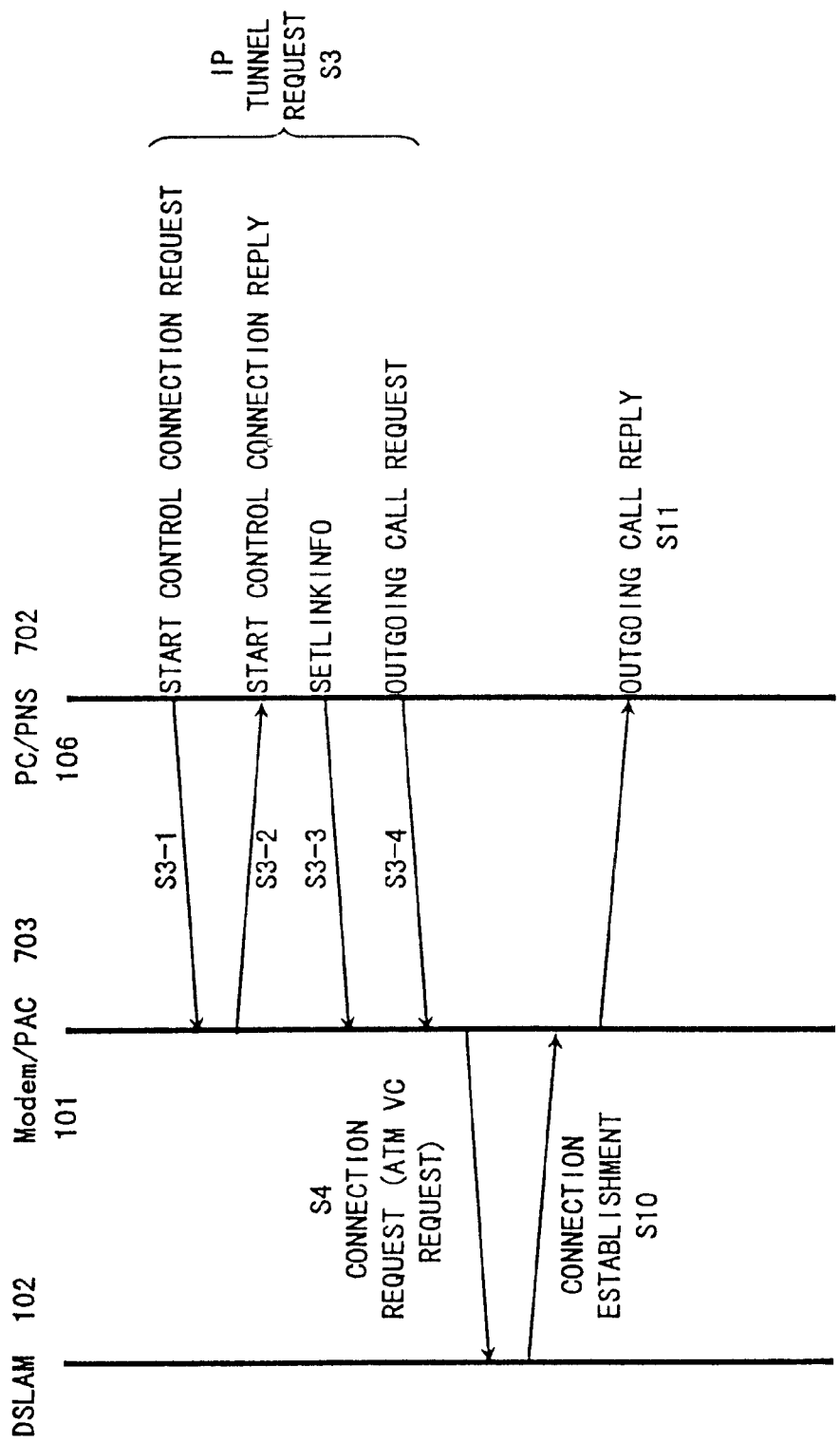
F I G. 1 4

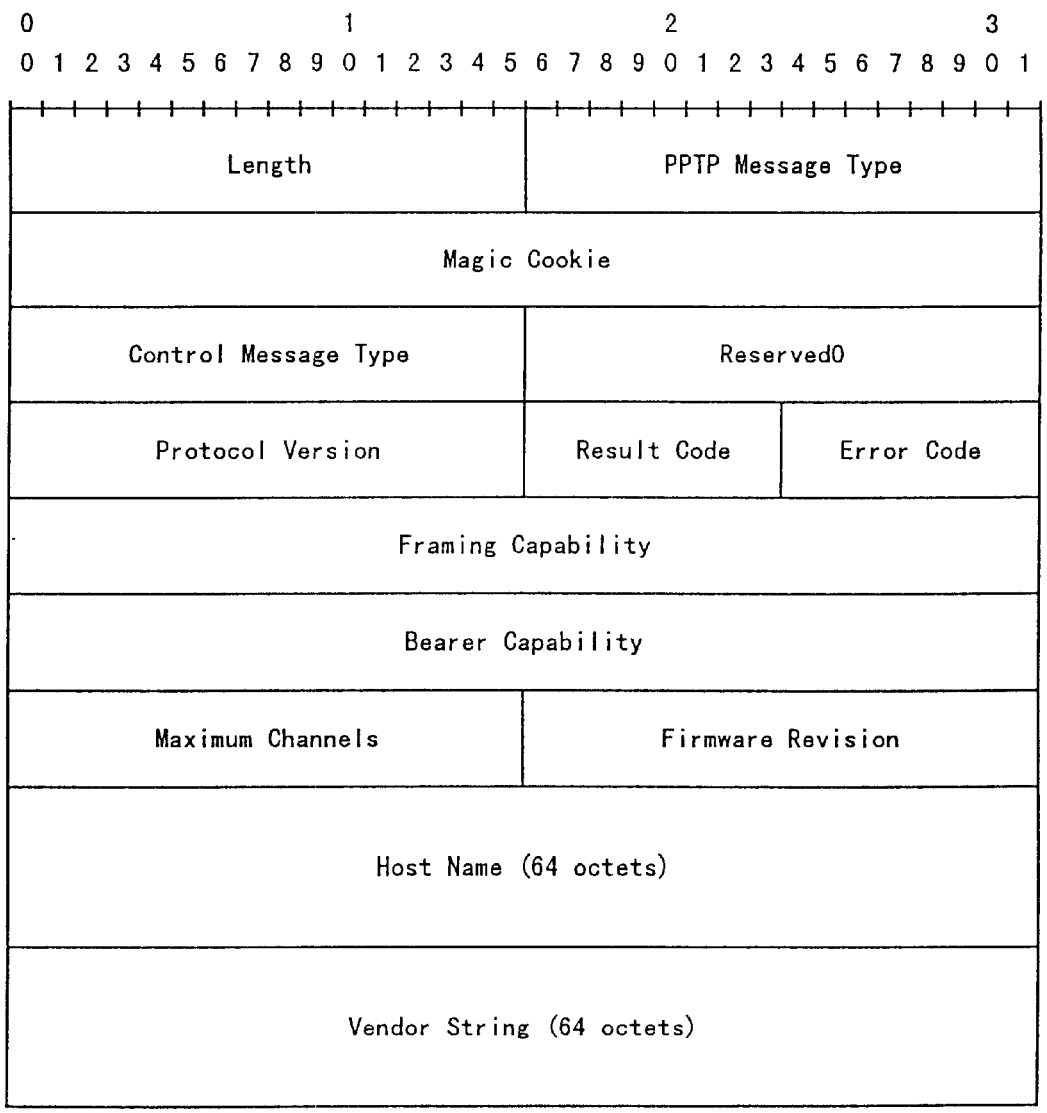
F I G. 1 6

| * | CELL NAME | DIRECTION | CAPABILITY |
|---|---|---|---|
| 1 | IDLE VC INDICATION CELL | Con. Mgr. →SVC Cont | • EXPLICITLY INDICATING TO SVC Cont THAT THE VC IS NOT USED |
| 2 | CONNECTION CONFIRM CELL | SVC Cont →Con. Mgr. | • CONFIRMING Con. Mgr. THAT VC IS IDLE WHEN SVC Cont DESIRES TO USE THE VC FOR ITS PORT |
| 3 | CONNECTION CONFIRM REPLY CELL | Con. Mgr. →SVC Cont | • USED BY Con. Mgr. IN ORDER TO NOTIFY SVC Cont OF VC STATE<br>• UPON RECEIPT OF THIS CELL, SVC Cont LINKS DROP VC TO FEEDER VC |
| 4 | CONNECTION GET CELL | SVC Cont →Con. Mgr. | • USED BY SVC Cont IN ORDER TO NOTIFY Con. Mgr. THAT SVC Cont WHICH CONFIRMED THAT VC IS IDLE HAS OBTAINED CORRESPONDING VC<br>• UPON RECEIPT OF THIS CELL, Con. Mgr. MUST STOP TRANSMISSION OF VC INDICATION CELL FOR CORRESPONDING VC<br>• IF VC INDICATION CELL IS TRANSMITTED EVEN AFTER THIS CELL IS TRANSMITTED, SVC Cont REPEATEDLY TRANSMITS THIS CELL UNTIL TRANSMISSION OF VC INDICATION CELL IS STOPPED<br>• IF INDICATION CELL IS TRANSMITTED THE NUMBER OF TIMES WHICH EXCEEDS THRESHOLD NUMBER SET AT SYSTEM START-UP, SVC Cont EXTERNALLY OUTPUTS THIS FACT AS FAULT INFORMATION |
| 5 | CONNECTION GET REPLY ACKNOWLEDGE CELL | Con. Mgr. →SVC Cont | • UPON RECEIPT OF CONNECTION GET CELL, RESPONSE IS MADE WITH THIS CELL IF SVC Cont USES CORRESPONDING VC AS INDICATED BY NOTIFICATION. UPON RECEIPT OF THIS CELL SVC Cont AGAIN SEARCHES NOMINATED VC MAP |
| 6 | CONNECTION GET REPLY CELL | Con. Mgr. →SVC Cont | • UPON RECEIPT OF CONNECTION GET CELL, THIS CELL IS USED IN ORDER TO NOTIFY VC Cont TO USE ANOTHER VC |

FIG. 20

| | | | |
|---|---|---|---|
| 7 | CONNECTION RELEASE CELL | SVC Cont →Con. Mgr. | • WHEN CALL TRANSMITTING REQUEST IS ISSUED FROM MODEM AND SVC Cont STOPS USING CORRESPONDING VC, THIS IS NOTIFIED TO Con. Mgr.<br>• UPON RECEIPT OF THIS CELL, Con. Mgr. STARTS TRANSMISSION OF IDLE VC INDICATION CELL FOR CORRESPONDING SVC<br>• IF Con. Mgr. DOES NOT START TRANSMISSION, SVC Cont REPEATEDLY TRANSMITS THIS CELL UNTIL Con. Mgr. STARTS THE TRANSMISSION<br>• IF VC INDICATION CELL IS TRANSMITTED THE NUMBER OF TIMES WHICH EXCEEDS THRESHOLD NUMBER SET AT SYSTEM START-UP, SVC Cont EXTERNALLY OUTPUTS THIS FACT AS FAULT INFORMATION |
| 8 | INFORMATION TRANSFER CELL | SVC Cont →Con. Mgr. | • USED FOR TRANSFERRING INFORMATION REQUIRED FOR SYSTEM OPERATION PARTICULARLY IN DIRECTION FROM SVC Cont TO Con. Mgr.<br>• ACTUAL CONTENTS ARE SPECIFIED BY CELL TYPE SUB-IDENTIFIER |
| 9 | INFORMATION TRANSFER CELL | Con. Mgr. →SVC Cont | • USED FOR TRANSFERRING INFORMATION REQUIRED FOR SYSTEM OPERATION PARTICULARLY IN DIRECTION FROM Con. Mgr. TO SVC Cont<br>• ACTUAL CONTENTS ARE STIPULATED BY CELL TYPE SUB-IDENTIFIER |

FIG. 21

SVC ACCESSING METHOD FOR USE IN ATM-DSLAM

BACKGROUND OF THE INVENTION

1. Field of the Invention

The present invention relates to a network accessing technique based on an ATM (Asynchronous Transfer Mode) technique and a DSL (Digital Subscriber Line) technique.

2. Description of the Related Art

With the rapid popularization of the Internet, the demand for quickly interconnecting end users and the Internet has been increasing.

FIG. 1 is a block diagram showing the configuration of a typical system for accessing the Internet.

An Internet backbone 2101 is directly connected with Web sites 2102, ftp sites 2103, enterprise LANs (Local Area Networks) 2104 with dedicated lines, and access points 2105 operated by Internet Service Providers (hereinafter referred to as ISPs).

Each general user (home user) or each user 2107 in a small enterprise makes a connection to a desired site via the Internet backbone 2101 by accessing an access point 2105 from a PC (Personal Computer) or a LAN via an access network 2106.

Since the Internet backbone 2101 and the access point 2105 are normally interconnected with a high-speed dedicated digital line, a fast access is ensured. In the meantime, the access network 2106 linking a user 2107 and an access point 2105 is typically a low-speed network such as a public telephone network, an ISDN (Integrated Services Digital Network), etc. in many cases, although a dedicated digital line network may be sometimes used.

However, it has become difficult for such a low-speed network to meet the rapidly increasing demand for the Internet in recent years. Especially, as a SOHO (Small Office/Home Office) becomes popular, the demand for quickly connecting a small-scale LAN to the Internet has been increasing.

Introduction of a new high-speed line infrastructure such as an optical fiber, etc. is a final solution in order to meet such demands. However, since this requires a lot of equipment investment, labor and time, it can hardly become a practical and short-term solution.

As a viable alternative, the DSL (Digital Subscriber Line) technique attracts public attention as a high-speed communications technique which uses telephone copper wire cables currently arranged in most homes and enterprises as they are and can coexist with communications using existing telephones.

The DSL technique is one type of modem technique. This technique includes methods such as an ADSL (Asymmetric DSL), an SDSL (Symmetric DSL), an HDSL (High bit rate DSL), a VDSL (Very high bit rate DSL), etc., which were developed for supporting various transmission rates, a symmetric/asymmetric communication, a modulation/demodulation method type, etc. These methods are generally referred to as an xDSL. The general term "xDSL" is hereinafter used in this specification.

With the xDSL technique, xDSL modems are arranged at both ends of an existing copper wire cable which links a subscriber home and an accommodation station of a common carrier. As a modulation/demodulation method in this case, any of three methods such as a 2B1Q (2 Binary 1 Quarternary), a CAP (Carrier-less Amplitude/Phase modulation), and a DMT (Discrete Multi-Tone) is adopted. With any of these modulation/demodulation methods, a high-speed communication of several-hundred to several-mega bits per second is made over a high-frequency band of approximately 30 KHz to 1 MHz.

As described above, the frequency bandwidth used in an xDSL communication differs from that of approximately 30 Hz to 4 KHz, which is used by a telephone speech signal. In such a case, a telephone speech signal and an xDSL signal can be multiplexed on one subscriber line by connecting circuits for different frequencies, which are referred to as splitters, to both of the xDLS modems within the subscriber home and within the common carrier. That is, in the subscriber home, the telephone and the xDSL modem are connected to the subscriber line via the splitter within the subscriber home. In the meantime, in the accommodation station, the existing telephone switch and the XDSL modem are connected to the subscriber line via a splitter within the accommodation station.

A collective modem which has a multiplexing capability and is referred to as a DSLAM (DSL Access Multiplexer) is mainly used as the xDSL modem within the accommodation station. With the DSLAM, xDSL signals from a plurality of xDSL lines are terminated by respective modem circuits, and the respectively terminated xDSL signals are multiplexed by a high-speed backbone interface. Use of such a DSLAM allows an xDSL line to be employed as a low-cost and high-speed access line leading to each type of backbone.

The above described backbone includes a dedicated line network, which is connected via a high-speed dedicated digital line interface and links headquarters and branch offices within an enterprise, the Internet connected via a LAN and a router, an ATM (Asynchronous Transfer Mode) network connected via an ATM interface such as a SONET interface, etc.

The technique for using the DSLAM as the front end of the ATM network among the above described techniques is expected to be a promising technique for implementing an ATM service on a global scale where common carriers tend to utilize a basic trunk line system in an ATM form. Furthermore, the ATM network is anticipated as a network for implementing the Internet backbone 2101 and the access network 2106, which are shown in FIG. 1. Considering this fact and the convenience where an existing copper wire cable can be used while maintaining a telephone service, it is significant that the xDSL line accommodated by the DSLAM is used as an access line to the ATM network or to the Internet.

In this case, an IP datagram transmitted, for example, from the PC or the LAN possessed by the user 2107 to the Web site 2102, is converted into an ATM cell and is further converted into an XDSL signal by the XDSL modem in the user 2107's home.

The xDSL signal is transmitted to the copper wire cable which is the subscriber line via the splitter in the user 2107's home, and reaches the accommodation station.

After the xDSL signal is split from a telephone speech signal by the splitter in the accommodation station, it is received by the DSLAM within the accommodation station.

The ATM cell received by the DSLAM is multiplexed with an ATM cell received from another subscriber line, and then transmitted to an ATM interface (such as a SONET interface) leading to the access network 2106 configured by the ATM network.

The ATM cell which has passed through the access network 2106 is received by an access server within the access point 2105. The access server extracts the IP datagram from the received ATM cell.

The extracted IP datagram is transferred to the Web site 2102 via the Internet backbone 2101.

To typically implement the connection to the Internet, the user 2107 first makes a point-to-point connection to the access server within the access point 2105 which is the entry to the Internet backbone 2101 by using a protocol referred to as a PPP (Point to Point Protocol). At this time, the user 2107 is assigned a global IP address which is determined according to a protocol referred to as an IP (Internet Protocol) and can be uniquely identified on the Internet, from a DHCP (Dynamic Host Configuration Protocol) server etc. belonging to an access server depending on need. Thereafter, the user 2107 stores the IP datagram including the IP address of an opposing server in a PPP packet by using a global IP address which is originally possessed by the user 2107 or is dynamically assigned, and exchanges the IP datagram with a server at a destination side.

In the meantime, for example, if two communicating devices make a communication in an ATM network, ATM addresses must be respectively assigned to both of the devices. At the same time, an ATM connection (VC: Virtual Connection/Channel) which can be uniquely identified within the ATM network must be established between the two devices.

Accordingly, with the technique for integrating the xDSL line, the ATM network, and the Internet, an ATM connection must be established based on the specification of ATM addresses between the xDSL modem within the user 2107 and the access server within the access point 2105 when a PPP session is started, as described above.

However, since the xDSL technique assumes that a high-speed communication is made at a low cost by directly linking an XDSL mode within a subscriber home and a DSLAM within an accommodation station, there is no concept of connecting/disconnecting an xDSL communication for each communication. Therefore, this technique does not work well with the control for establishing/releasing an ATM connection.

Accordingly, a dedicated line connection form where the access server within the access point 2105, the DSLAM within the accommodation station,. and the xDSL modem in the subscriber home are continuously connected with a PVC (Permanent Virtual Connection/Channel) was conventionally adopted in the network system where the xDSL line, the ATM network, and the Internet are integrated.

However, the same number of ATM connections as that of users 2107 are required in the above described conventional connection form, although general end users such as home users, etc. are not continuously connected to the Internet. Therefore, the connection resources (more specifically, the number of VPIs/VCIs or the bandwidth used by a switch) within the ATM network are fixedly and wastefully used, which leads to the inability of ATM networks being applied to a large number of subscribers.

An SVC (Switched Virtual Connection/Channel) which is a connection for each call may be applied to overcome this problem. However, because the connection form of the xDSL communication is assumed to be connectionless as described above, this communication does not work well with a connectionless SVC communication and an effective SVC controlling method does not currently exist.

SUMMARY OF THE INVENTION

The present invention was developed in the above described background, and aims at realizing a connection form where the connection resources within an ATM network can be efficiently used, when an xDSL line is connected to a particular destination such as an access server, etc. via a cell switching network such as an ATM network, etc.

One mode of the present invention assumes a method with which a subscriber side modem which performs modulation/demodulation with a digital subscriber line method accesses an access server connected to an ATM switch network by using ATM cells transferred with an asynchronous transfer mode method via an accommodation station side modem, which accommodates a digital subscriber line to which the subscriber side modem is connected.

The access server and the accommodation side modem are continuously connected by a permanent virtual connection.

Next, a virtual connection which is unused within the permanent virtual connection is managed in the access server and the accommodation station side modem.

The accommodation station side modem communicates with the access server based on a call originating request issued from the subscriber side modem, so that the unused virtual connection is allocated to the subscriber side modem.

According to the present invention, a PVC is established beforehand between an accommodation station side terminating device (modem) and an access server. The accommodation station side terminating device (modem) makes a communication with the access server based on the call originating request issued from the subscriber side terminating device (modem), so that an unused virtual connection is allocated to the subscriber side terminating device. As a result, the accommodation station side terminating device (modem) and the access server are continuously connected by the above described PVC, whereby the connection resources can be significantly reduced, a connection control can be dramatically simplified, and the response performance can be improved in comparison with the case where the accommodation station side terminating device and the access server are connected for each call.

Additionally, according to the present invention, the control for establishing/releasing a virtual connection within the PVC can be efficiently performed by using management and maintenance broadcast cells.

Furthermore, according to the present invention, the operation/non-operation of the accommodation station side modem can be controlled according to the operation/non-operation of the subscriber side modem, thereby preventing a waste of electric power when no communication is made.

Still further, according to the present invention, a line can be disconnected even if a link is disconnected without a proper process such as a process for powering down a modem or a PC.

BRIEF DESCRIPTION OF THE DRAWINGS

One skilled in the art can easily understand additional features and objects of the present invention from the description of the preferred embodiment and some of the attached drawings, in which:

FIGS. 4(a) through 4(f) show the data formats of the communications protocol stack in a PC 106;

FIGS. 6(a) through 6(c) show the data formats of a communications protocol stack in the modem 101 on an ATM side;

FIG. 8 shows the configuration of the modem 101;

FIG. 10 shows the configuration of the access server 104;

FIG. 11 shows the data structure of an OAM cell;

FIG. 12 shows the data structure of a nominated VC map;

FIG. 14 shows the sequence for connecting an IP tunnel and an ATM VC;

FIG. 16 shows the data format of a start control connection reply;

FIG. 20 shows a control cell list (No. 1); and

FIG. 21 shows a control cell list (No. 2).

DESCRIPTION OF THE PREFERRED EMBODIMENT

Figure 1:
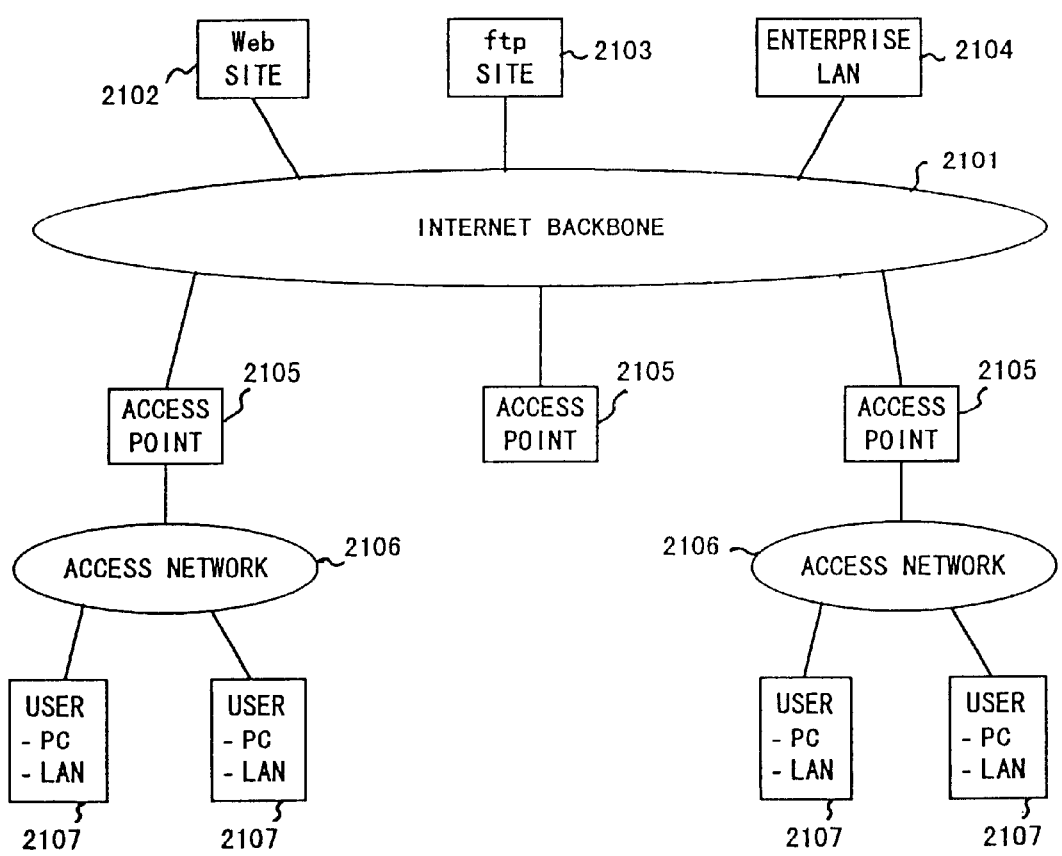
FIG. 1 is a block diagram showing the configuration of a system for accessing the Internet.

Provided below is the explanation about the details of a preferred embodiment according to the present invention by referring to the drawings.

<System Configuration of a Preferred Embodiment According to the Present Invention>

Figure 2:
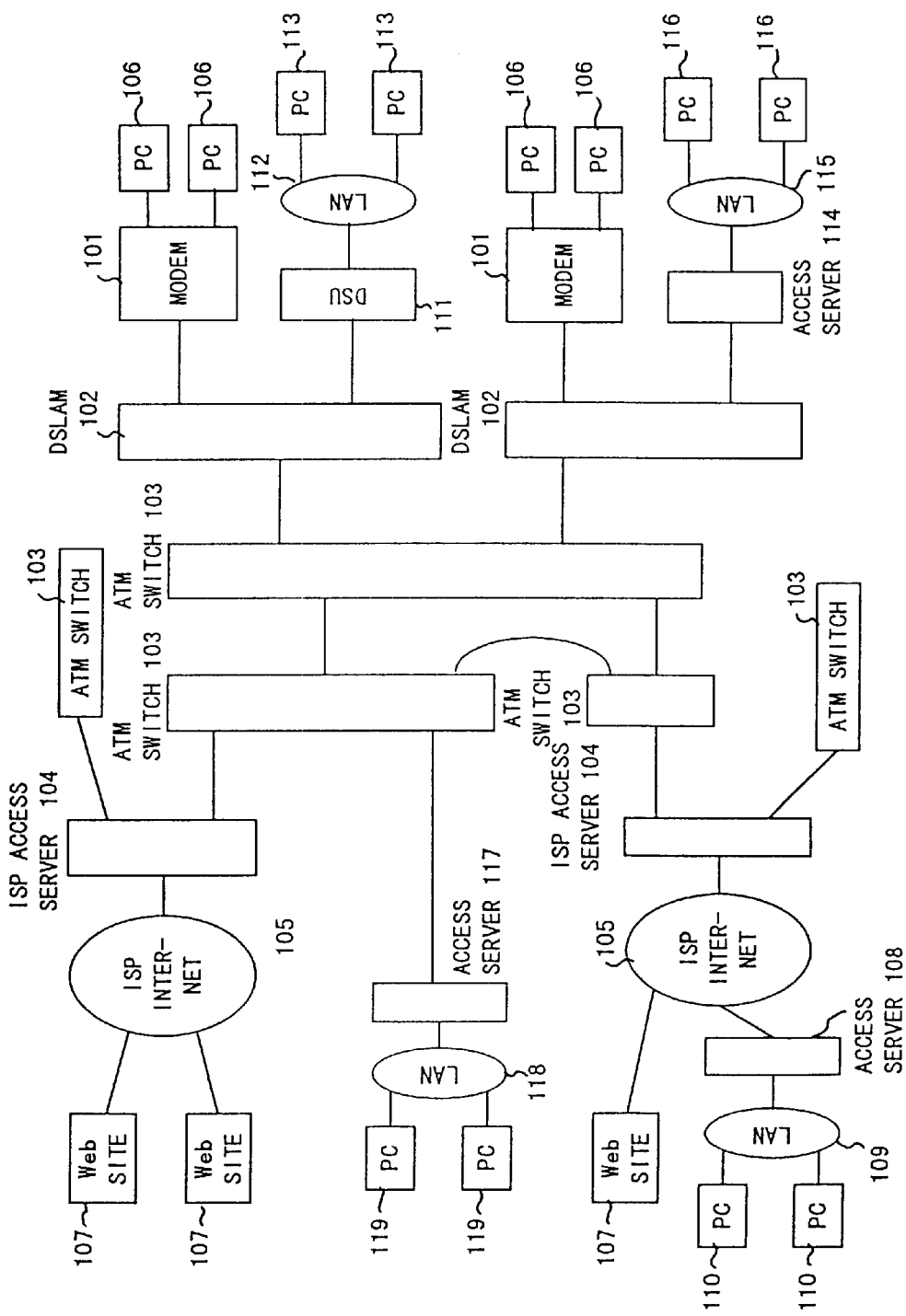
FIG. 2 is a block diagram showing the configuration of a network system according to a preferred embodiment of the present invention.

FIG. 2 is block diagram showing the configuration of a network system according to a preferred embodiment of the present invention.

A modem 101 is an xDSL modem. One or more PCs 106 are connected to the modem 101 via 10Base-T interfaces.

The modem 101 and a DSLAM 102 are connected by a copper wire cable which is an existing subscriber line.

Further, a splitter may be respectively arranged within a subscriber home and an accommodation station between the modem 101 and the DSLAM 102,.

ATM switches 103, an ATM switch 103 and a DSLAM 102, an ATM switch 103 and an ISP (Internet Service Provider) side access server 104, an ATM switch 103 and an access server 117, etc. are respectively interconnected by SONET interfaces.

The ISP side access server 104 is connected to an Internet 105 belonging to the corresponding ISP. Web sites 107 or another access server 108 which accommodates a LAN 109 to which PCs 110 are connected is connected to the Internet 105. An IP communication using an IP datagram is made on the Internet 105.

The DSLAM 102 may be connected with a LAN 112 which accommodates PCs 113, etc. via a DSU (Data Service Unit) 111 in addition to the modem 101. In this case, the DSLAM 102 and the DSU 111 are continuously connected.

The DSLAM 102 may be connected with an access server 114 which supports an xDSL communication, and the access server 114 may further be connected with a LAN 115 which accommodates PCs 116.

Additionally, an ATM switch 103 may be connected with an access server 117 to which an in-house LAN 118 which accommodates PCs 119 is connected.

<Communications Protocol Stacks Between Respective Devices>

Figure 3:
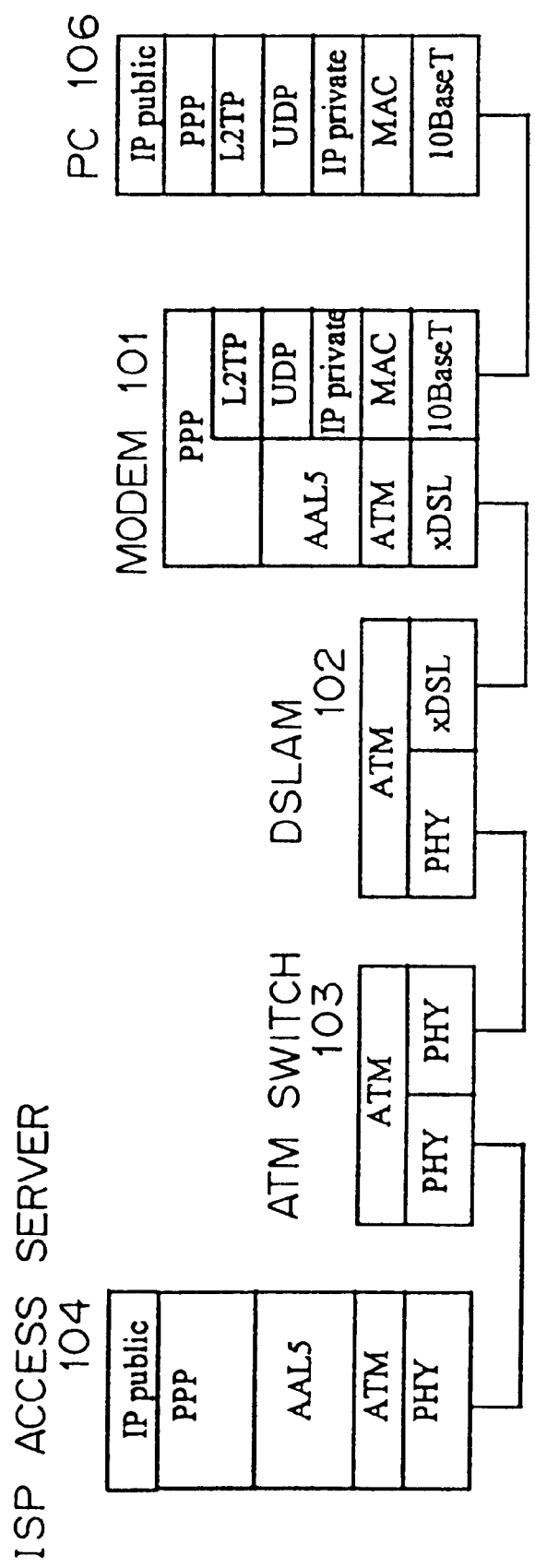
FIG. 3 shows communications protocol stacks between respective devices.

FIG. 3 shows the communications protocol stacks between respective devices configuring the network shown in FIG. 2.

Figure 5:
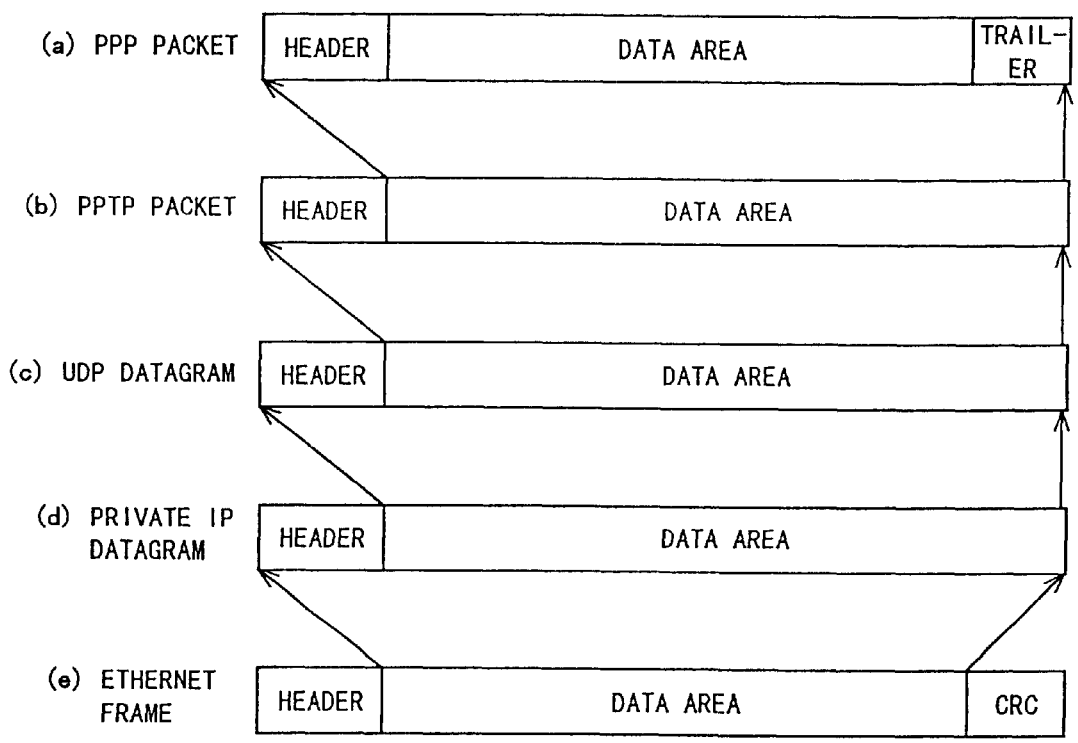
FIGS. 5(a) through 5(e) show the data formats of a communications protocol stack in a modem 101 on an IP tunnel side.

Provided first is the explanation about a communication protocol between a PC 106 and a modem 101 by taking as an example the case where data is transferred from the PC 106 to the modem 101 with reference to FIGS. 3 through 5. Note that the communications protocol is the same also in the case where data is transferred from the modem 101 to the PC 106, except for the difference that the flow of the data becomes reversed.

User information (such as TCP (Transfer Control Protocol) segment data, etc.) generated by an application within the PC 106 is stored in a data area of the IP datagram where a public IP address is specified in its header, as shown in FIG. 4(a). The public IP address can be uniquely identified in the Internet space around the world. As will be described later, the IP address assigned to the IP datagram is identified by the ISP side access server 104 (simply referred to as an access server 104 hereinafter), so that the IP datagram is transferred, for example, to a Web site 107 on the Internet 105 shown in FIG. 2.

Next, the IP datagram is stored in the data area of a PPP packet to which a header and a trailer are added, as shown in FIG. 4(b). After the PPP packet is identified by the modem 101, it is terminated by the access server 104, as will be described later. With this packet, a point-to-point data communication between the PC 106 and the access server 104 can be made via the modem 101.

The PPP packet is then stored in the data area of the PPP packet generated based on a PPTP (Point to Point Tunneling Protocol) or an L2TP (Layer 2 Tunneling Protocol) as shown in FIG. 4(c). This PPTP (or L2TP) packet is terminated by the modem 101 as will be described later. The PPTP (or the L2TP) is a protocol for relaying a PPP packet to a second device whose line is connected to a first device so that the first device which is not directly connected to a line communicates with a PPP connection destination which is reachable via a line. In this case, the PPTP (or L2TP) packet including the PPP packet is made to pass through a logical communication channel between the first and second devices. In the preferred embodiment of the present invention, the PPTP (or L2TP) packet generated by the PC 106 which is not directly connected to an xDSL line is transmitted to the modem 101 through the tunnel of a private IP communication channel to be described next. The modem 101 extracts the PPP packet from the PPTP (or L2TP) packet, and transmits the extracted packet to the xDSL line leading to the access server 104 which is a PPP connection destination. The reason why the PPP packet is included in the PPTP (or L2TP) packet is to allow a plurality of sessions to be processed without inconsistency. To implement this, an identifier for identifying each session or a sequence number, etc. is stored in the header of the PPTP (or L2TP) packet.

Next, in the PC 106, the PPTP (or L2TP) packet is stored in the data area of a UDP datagram generated based on a UDP (User Datagram Protocol) as shown in FIG. 4(d). The UDP datagram is terminated by the modem 101 as will be described later. A port number for identifying a PPTP (or L2TP) driver application which processes a PPTP (or L2TP) packet is assigned to the header of the UDP datagram.

Additionally, in the PC 106, the UDP datagram is stored in the data area of the IP datagram where an IP address in private IP addresses which assigned for the local network between the PC 106 and the modem 101 is assigned to its header, as shown in FIG. 4(*e*). Even if a user who possesses the modem 101 can assign, for example, only one public IP address with the private IP datagram, the device (PC 106) within the LAN, to which the modem 101 is connected, can make an intercommunication in a local address space.

Lastly, in the PC 106, the private IP datagram is stored in the data area of an Ethernet frame generated based on an MAC (Media Access Control) protocol as shown in FIG. 4(*f*), and is transmitted to a 10Base-T interface. The physical address of either of the devices between which a communication is made is specified in the header of the Ethernet frame. With this frame, the control for preventing a frame collision in the 10Base-T interface is performed.

After the Ethernet frame transmitted to the 10Base-T interface in the above described way is received by the modem 101, the private IP datagram is extracted from its data area as shown in FIGS. 5(*e*) and 5(*d*).

Next, in the modem 101, the UDP datagram is extracted from the data area of the private IP datagram as shown in FIG. 5(*c*).

Then, in the modem 101, a PPTP (or L2TP) driver application is invoked based on the port number assigned to the header of the UDP datagram, so that the PPTP (or L2TP) packet is extracted from the data area of the UDP datagram by the invoked driver as shown in FIG. 5(*b*).

Furthermore, in the modem 101, the PPP packet is extracted from the data area of the PPTP (L2TP) packet after the PPP session is identified based on the information assigned to the header of the packet, as shown in FIG. 5(*a*).

Figure 7:
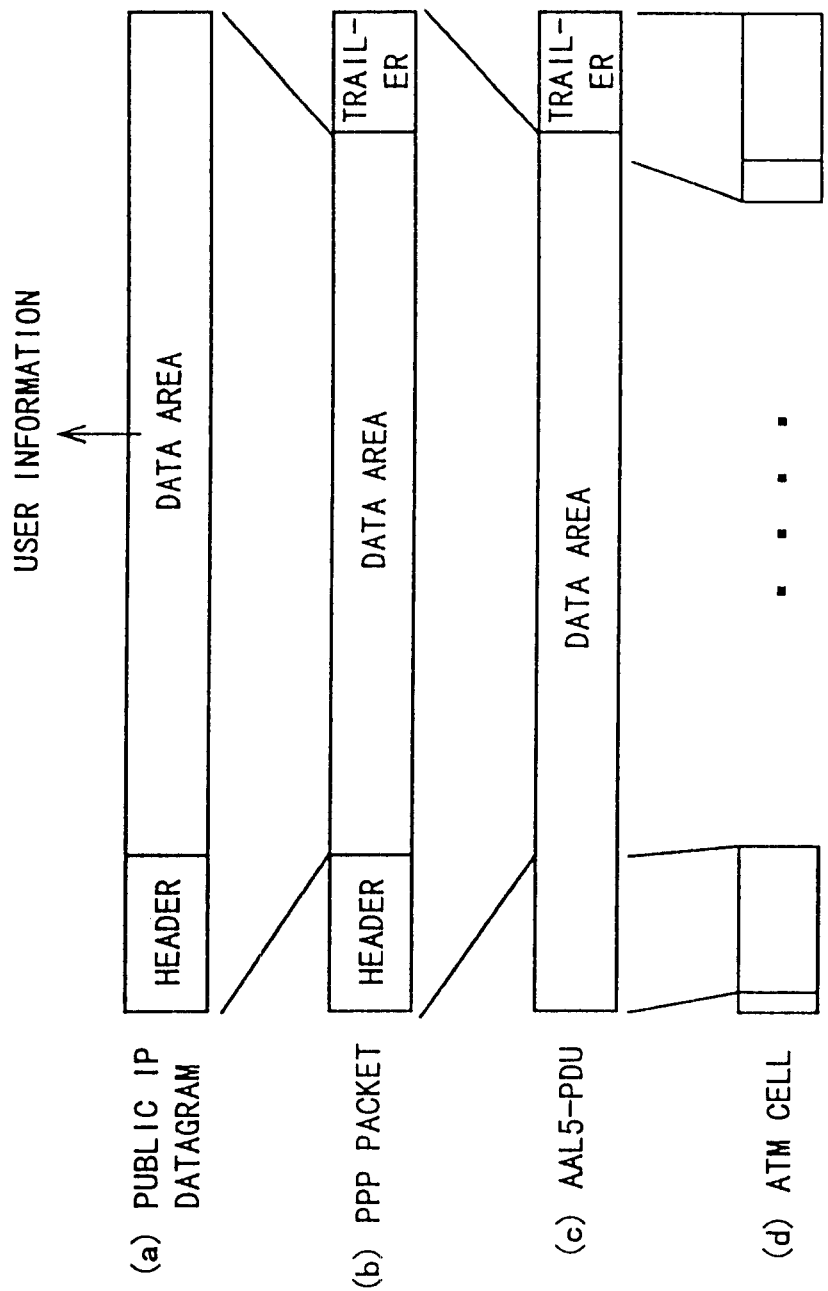
FIGS. 7(a) through 7(d) show the data formats of a communications protocol stack in an access server 104.

Provided next is the explanation about the communications protocol between the modem 101 and the access server 104 by taking as an example the case where data is transferred from the modem 101 to the access server 104 with reference to FIGS. 3, 6, and 7. The communications protocol is the same also in the case where data is transferred from the access server 104 to the modem 101, except for the difference that the flow of the data becomes reversed.

The modem 101 stores the PPP packet received from the PC 106 in the data area of an AAL 5 (ATM Adaption Layer 5) protocol data unit unchanged without further extracting the public IP datagram (refer to FIG. 4(*a*)) from the PPP packet, as shown in FIGS. 6(*a*) and 6(*b*). The AAL5 protocol data unit includes a CRC (Cyclic Redundancy Check) code for correcting data in its trailer.

The modem 101 then stores the AAL5 protocol data unit in the payload of one or more ATM cells as shown in FIG. 6(*c*). The algorithm for determining an ATM cell connection particularly relates to the present invention. This will be described later.

Lastly, the modem 101 modulates the data stream of the ATM cells to an xDSL signal, and transmits the modulated signal to a subscriber line.

The xDSL signal transmitted to the subscriber line in the above described way is received by the DSLAM 102 shown in FIG. 2.

The DSLAM 102 extracts the ATM cells by demodulating the xDSL signal received from the subscriber line.

After the DSLAM 102 converts the connection information included in the header of the ATM cells, it transmits the ATM cells to a SONET interface which uses an optical fiber as a physical medium (PHY), as they are, without extracting the user information from the ATM cells. More precisely, the format of the SONET signal is assembled from the ATM cells.

The ATM cells transmitted to the SONET interface in this way are made to pass through the SONET interface by being switched by one or more ATM switches 103 (shown in FIG. 2) in an ATM cell level.

Upon receipt of one or more ATM cells from the SONET interface (PHY), the access server 104 extracts the AAL5 protocol data unit from the data area of each of the ATM cells and assembles the extracted units, as shown in FIGS. 7(*d*) and 7(*c*).

The access server 104 then extracts the PPP packet from the data area of the AAL5 protocol data unit as shown in FIG. 7(*b*).

Lastly, the access server 104 extracts the IP datagram from the data area of the PPP packet as shown in FIG. 7(*a*).

The access server 104 routes the IP datagram by identifying the public IP address assigned to the header of the IP datagram, converts the IP datagram into the physical frame format of an output side line, and then transmits it to the Internet 105.

<Configuration of the Modem 101>

FIG. 8 shows the configuration of the modem 101 of FIG. 2.

As a feature relating to the present invention, the modem 101 has a capability for transmitting an upstream having a predetermined frequency to the DSLAM 102 via an xDSL driver 712 when the modem 101 is powered up. The XDSL driver 712 powers up the xDSL driver for the corresponding xDSL line, etc. by detecting this upstream. As a result, a waste of electric power can be prevented when no communication is made.

A 10Base-T hub 701 connects a plurality of PCs 106 with Ethernet cables.

A PAC (PPTP Access Concentrator) 703, together with a PNS (PPTP Network Server) 702 within the PC 106, provides a client/server capability for controlling the PPTP (Point to Point Tunneling Protocol).

A PPTP (or L2TP) multiplexing circuit 704 within the PAC 703 receives an Ethernet frame from the 10Base-T hub 701, extracts a PPTP (or L2TP) packet as sequentially shown in FIGS. 5(*e*) to 5(*b*), and passes the extracted packet to a PPTP controller 705 corresponding to each PPP session.

Conversely, the PPTP multiplexing circuit 704 assembles an Ethernet frame from the PPTP (or L2TP) packet passed from each PPTP controller 705 in the order of FIGS. 5(*b*) to 5(*e*), multiplexes Ethernet frames, and transmits the multiplexed frame from the 10Base-T hub 701 to the PC 106.

Next, the PPTP controller 705 within the PAC 703 extracts the PPP packet from the PPTP (or L2TP) packet as shown in FIG. 5(*a*), and passes the extracted packet to a corresponding SAR 710 connected to the PPTP controller 705.

Conversely, the PPTP controller 705 assembles the PPTP (or L2TP) packet from the PPP packet passed from the corresponding SAR 710 in the order of FIGS. 5(*a*) to 5(*b*), and passes the assembled packet to the PPTP multiplexing circuit 704.

A BootP server 706 within the PAC 703 assigns to the PC 106 an IP address in private IP addresses which assigned for the local network between the PC 106 and the modem 101 by communicating with a BootP client 714 within the PC 106, when the PC 106 is connected to the 10Base-T hub 701 and is booted up.

An IP tunnel/ATM VC negotiator 707 performs conversion between the IP tunnel link information according to the PPTP (or the L2TP) and the ATM VC (ATM Virtual Connection) information which is the information about an ATM connection, and notifies a Q.2931 processor 709 or the PPTP controller 705 of the converted information.

Additionally, the IP tunnel/ATM VC negotiator 707 receives a transmission speed requested by the controller 705, when the PPTP controller 705 connected to the IP tunnel/ATM VC negotiator 707 detects the occurrence of the IP tunnel request issued from the PC 106. The IP tunnel/ATM VC negotiator 707 then arbitrates whether or not to accept the requested transfer speed by making an inquiry to a resource manager 708 which manages the bandwidth of an xDSL line, and feeds back the transfer speed determined based on the result of the arbitration to the PPTP controller 705.

The Q.2931 processor 709 performs the control of connecting/disconnecting an ATM VC between the DSLAM 102 and the modem 101 itself according to the ITU-T Q.2931 signaling procedures. When an ATM VC request is issued, a VPI (Virtual Path Identifier)/VCI (Virtual Channel Identifier) for an ATM VC is assigned from the DSLAM 102. Therefore, the Q.2931 processor 709 sets the assigned VPI/VCI to the SAR (Segmentation And Reassembly unit) 710.

The SAR 710 assembles an ATM cell from the PPP packet passed from the PPTP controller 705 to which the SAR 710 is connected in the order of FIGS. 6(a), to 6(c), assigns the VPI/VCI notified from the Q.2931 processor 709 to the header of the assembled ATM cell, and passes the ATM cell to a cell multiplexing circuit 711.

Conversely, the SAR 710 assembles a PPP packet from the ATM cell passed form the cell multiplexing circuit 711 in the order of FIGS. 6(c) to 6(a), and passes the assembled packet to the PPTP controller 705 to which the corresponding SAR 710 is connected.

The cell multiplexing circuit 711 multiplexes the ATM cells passed from a plurality of SARs 710, and passes the multiplexed cell to an xDSL driver 712.

Conversely, the cell multiplexing circuit 711 demultiplexes each ATM cell corresponding to each of the plurality of SARs 710 from the ATM cell group passed from the xDSL driver 712, and passes the demultiplexed ATM cell to each corresponding SAR 710.

The xDSL driver 712 modulates the multiplexed signal passed from the cell multiplexing circuit 711, and transmits the resultant xDSL signal to a subscriber line which is an xDSL line.

Conversely, the xDSL driver 712 receives the xDSL signal from the subscriber line, demodulates the xDSL signal, and passes the resultant multiplexed signal to the cell multiplexing circuit 711.

A rate controller 713 detects the bandwidth used by the xDSL line and controls the bandwidth for the xDSL line. The bandwidth control state is managed by the resource manager 708.

<Configuration of the DSLAM 102>

Figure 9:
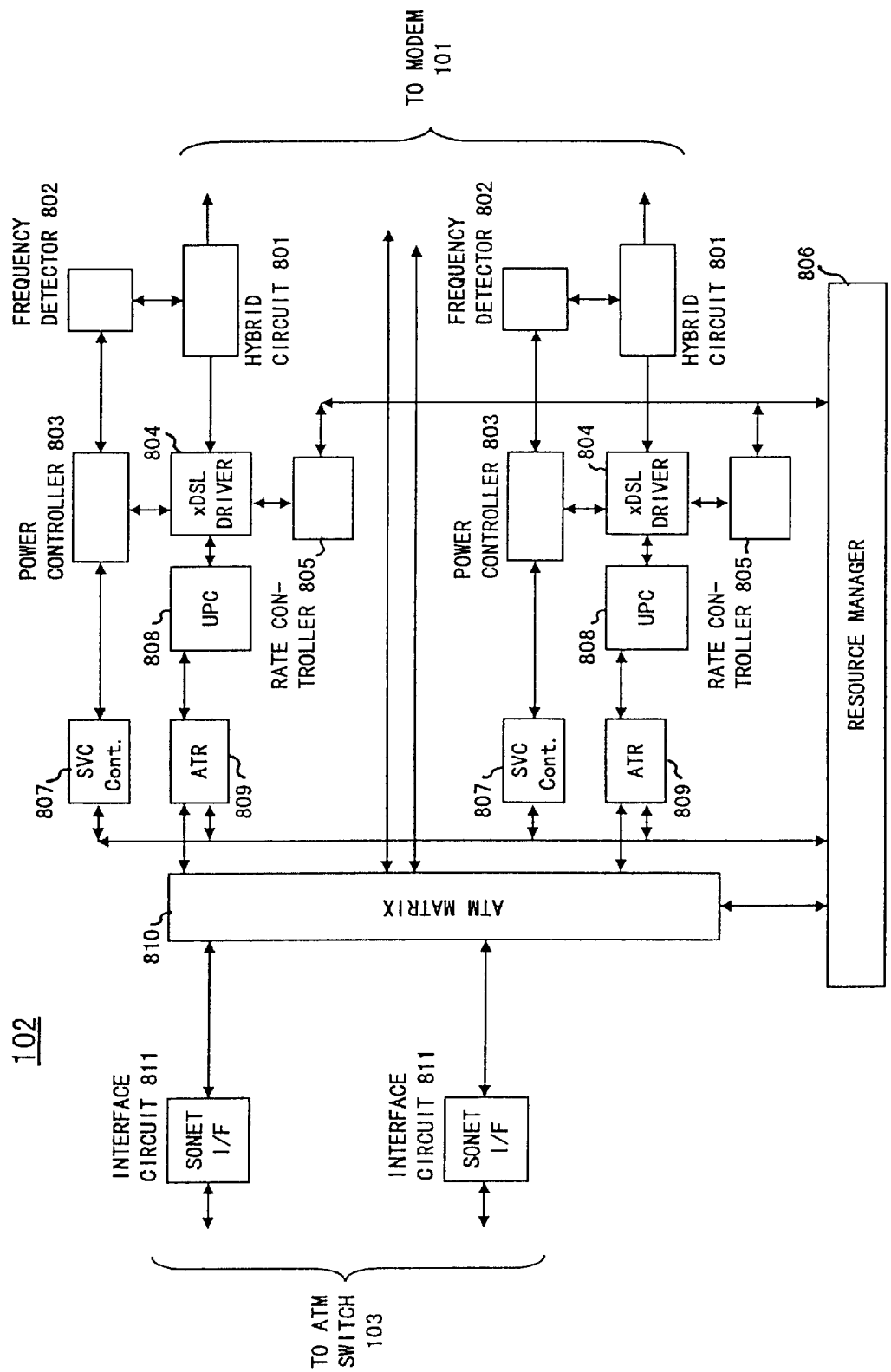
FIG. 9 shows the configuration of a DSLAM 102.

FIG. 9 shows the configuration of the DSLAM 102 illustrated in FIG. 2.

As a capability which particularly relates to the present invention, a frequency detector 802 detects an upstream having a predetermined frequency on a subscriber line which is an xDSL line via a hybrid circuit 801 to which the frequency detector 802 is connected. When the frequency detector 802 detects this upstream, a power controller 803 connected to the frequency detector 802 powers up an xDSL driver 804 and an SVC Cont. 807, which are connected to the power controller 803. As a result, a waste of electric power can be prevented when no communication is made.

The DSLAM 102 comprises a plurality of ports, each of which is configured by the respective circuits 801 through 805 and 807 through 809 in correspondence with each subscriber line which is an xDSL line.

In each of the plurality of ports, the xDSL driver 804 extracts an ATM cell by demodulating the xDSL signal received from the hybrid circuit 801 to which the xDSL driver 804 and a subscriber line is connected, and transfers the extracted ATM cell to an ATR 809 via a UPC (Usage Parameter Controller) 808.

Conversely, the xDSL driver 804 generates an xDSL signal by modulating the ATM cell transmitted from the ATR 809 via the UPC 808, and transmits the generated signal to the subscriber line via the hybrid circuit 801 to which the xDSL driver 804 is connected.

The rate controller 805 detects the bandwidth used by the XDSL line and controls the bandwidth for the xDSL line via the XDSL driver 804. The bandwidth control state is managed by a resource manager 806. The resource manager 806 also manages the use state of each ATM VC bandwidth by monitoring each buffer within an ATM matrix 810.

The UPC 808 performs usage parameter control for an ATM cell. Since this control does not particularly relate to the present invention, its details are omitted.

An SVC Cont. (SVC controller) 807 is a component which particularly relates to the present invention, and comprehensively controls the connection/disconnection of an ATM VC within the PVC (to be described later) established between the access server 104 and the DSLAM 102 itself. Its details will be described later.

An ATR (Address Translator) 809 performs a mutual rewrite operation between the VPI/VCI of the header of the ATM cell input/output to/from the ATM matrix 810 and the VPI/VCI of the header of the ATM cell input/output to/from the UPC 808. The VPIs/VCIs between which the rewrite operation is performed form a single ATM VC.

As will be described later, the ATM matrix 810 then connects to the ATR 809 connected to the SVC Cont. 807 the ATM cell having the VPI/VCI corresponding to the ATM VC, which is input/output to/from the SONET interface circuit 811 leading to the ATM switch 103, after one ATM VC is determined between the SVC Cont.807 within the port accommodating the subscriber line and a Con.Mgr. 902 within the access server 104 which is a connection destination based on an ATM VC request issued from the subscriber line side, after one ATM VC is determined.

Additionally, the ATM matrix 810 copies an OAM (Operation Administration and Maintenance) cell which is a control cell input from each SONET interface circuit 811 and will be described later within the ATM matrix 810 itself, outputs the copied cell to the ATRs 809 within all of the ports, and makes the cell reach the SVC Cont. 807 connected to each of the ATRs 809.

Conversely, the ATM matrix 810 copies the OAM cell output from the SVC Cont. 807 within each of the ports via the ATR 809, and outputs the copied cell to all of the SONET interface circuits 811.

The SONET interface circuits 811 are connected to the ATM switch 103 shown in FIG. 2.

A PVC (Permanent Virtual Connection/Channel) is established beforehand between the access server 104 (shown in FIG. 2) and the SONET interface circuit 811 within the DSLAM 102 which is reachable therefrom. For example, a predetermined VPI value and a predetermined range (or arbitrary) VCI value are assigned to this PVC. The ATM cell where the predetermined VPI value and the predetermined range (or arbitrary) VCI value are assigned to its header is transmitted from the SONET interface circuit 811, and is then fixedly transferred to the access server 104 by the ATM switch 103 (shown in FIG. 2). Also the reverse direction is the same. That is, the access server 104 and the DSLAM 102 are continuously connected, and the ATM switch 103 (shown in FIG. 2) therefore needs not perform the connection/disconnection procedures between the access server 104 and the DSLAM 102.

As described above, a PVC is established beforehand between the DSLAM 102 and the access server 104 according to the preferred embodiment of the present invention. In other words, a predetermined number of ATM VCs (VCI connections) and a predetermined communications bandwidth are secured beforehand between the DSLAM 102 and the access server 104.

Additionally, according to the preferred embodiment of the present invention, the procedure for establishing a connection is performed by using OAM cells between the SVC Cont.807 of the port which accommodates a subscriber line and is included in the DSLAM 102, and the Con.Mgr. 902 included in the access server 104 which is a connection destination, based on the ATM VC request issued from the subscriber line side, so that a single ATM VC (that is, a pair of a VPI and a VCI) within the PVC is allocated between the modem 101 connected to the subscribe line and the access server 104. As a result, it becomes possible to make a communication between the PC 106 connected to the modem 101 and the access server 104. When the communication between the PC 106 and the access server 104 is completed, this ATM VC is released.

In this case, the number of ATM VCs (the number of VCIs) and the communication bandwidth, which are secured for the PVC beforehand, may be much smaller than those required in the case where all of the modems 101 connected to the DSLAM 102 having the PVC simultaneously communicate with the access servers 104 corresponding to the PVC. (For example, one-fifth to one-tenth or so). This is because the number of general home users who can possibly and simultaneously make communications is statistically equal to or less than one-fifth to one-tenth of the total number of the users.

Additionally, the DSLAM 102 and the access server 104 are continuously connected by the above described PVC, whereby connection control can be significantly simplified and also the response performance can be improved in comparison with the case where the DSLAM 102 and the access server 104 are connected by an SVC for each call. Furthermore, the control of establishing/releasing an ATM VC within the PVC can be efficiently performed with the control using an idle VC indication cell and a nominated VC map, which relates to the present invention and will be described later.

<Configuration of the Access Server 104>

FIG. 10 is a block diagram showing the configuration of the access server 104 on the ISP side, which is shown in FIG. 2.

A SONET interface circuit 901 is connected to the ATM switch 103 shown in FIG. 2.

As described above, a PVC is established beforehand between the SONET interface circuit 901 and the SONET interface circuit 811 within the DSLAM 102, which is reachable therefrom.

A Con.Mgr (Connection Manager) 902 is a portion which particularly relates to the present invention, and performs the entire control of connecting/disconnecting an ATM VC within a PVC (to be described later) established between the DSLAM 102 and the access server 104 itself. Its details will be described later.

An SAR 903 assembles an IP datagram from the ATM cell passed from the Con.Mgr. 902 connected to the SAR 903 in the order of FIGS. 7(*d*) to 7(*a*), and passes the assembled IP datagram to an IP router 904.

Conversely, the SAR 903 assembles an ATM cell from the IP datagram passed from the IP router 904 in the order of FIGS. 7(*a*) to 7(*d*), and passes the assembled cell to the Con.Mgr. 902 to which the SAR 903 is connected.

The IP router 904 routes the IP datagram by identifying the public IP address specified in the header of the IP datagram passed from the SAR 903, converts the IP datagram into the physical frame format of the output side line, and transmits it to the Internet 105.

A DHCP (Dynamic Host Configuration Protocol) server 905 assigns an IP address to a PC 106 with DHCP procedures, when it begins to make a PPP communication with the PC 106.

<Details of Line Connection Procedures>

Provided below is the explanation about the details of the line connection procedures implemented in the preferred embodiment of the present invention, which has the above described configuration.

The start-up operations of an xDSL line when the modem 101 is powered up were described earlier.

Namely, the modem 101 transmits an upstream having a predetermined frequency to the DSLAM 102 via the xDSL driver 712 when power is turned on.

The frequency detector 802 of the port which accommodates the subscriber line connected to the modem 101 and is included in the DSLAM 102 detects an upstream having a predetermined frequency on the subscriber line via the hybrid circuit 801 to which the frequency detector 802 is connected. When the frequency detector 802 detects this upstream, the power controller 803 connected to the frequency detector 802 powers up the xDSL driver 804 and the SVC Cont. 807, which are connected to the power controller 803. As a result, a waste of electric power can be prevented when no communication is made.

The frequency detector 802 continues to monitor the upstream having the predetermined frequency on the subscriber line via the hybrid circuit 801 to which the frequency detector 802 is connected even after the corresponding xDSL line is started up.

If the frequency detector 802 detects a discontinuity of the upstream, it determines that the modem 101 is powered down. Then, the power controller 803 connected to the frequency detector 802 powers down the xDSL driver 804 and the SVC Cont. 807, which are connected to the power controller 803. As a result, a continuous waste of electric power can be prevented.

Provided next is the explanation about the details of the line connection procedures implemented in the preferred embodiment of the present invention.

In the preferred embodiment of the present invention, the SVC Cont.807 within each port receives an idle VC indication cell which is an OAM cell via the ATR 809 and the ATM matrix 810, to which the SVC Cont. 807 is connected, within the DSLAM 102 shown in FIG. 9.

The idle VC indication cell is transmitted by the Con.Mgr. 902 within the access server 104, which is shown in FIG. 10. The Con.Mgr. 902 broadcasts to all of the devices within the ATM network the VPI/VCI of an ATM VC which is unused in the range of the ATM VC belonging to the PVC that the Con.Mgr. 902 itself possesses via the SONET interface circuit 901 as the idle VC indication cell, at regular time intervals (such as at five-minute intervals).

FIG. 11 shows the data structure of an OAM cell which can form the idle VC indication cell.

Because the OAM cell is broadcast within an ATM network, the value of the VPI/VCI included in a cell header may be arbitrary (it is ignored). Additionally, the value "111" which instructs reference to inside of a payload is assigned as a payload type.

The payload of the OAM cell stores an AAL5 (ATM Adaptation Layer 5) protocol data unit.

The value "00000001" indicating the idle VC indication cell is assigned to the first octet as a cell type identifier.

The VPI/VCI indicating an ATM VC that the Con.Mgr. 902 does not currently use is particularly stored in an information field as a feature of the idle VC indication cell.

The idle VC indication cell is received by each SVC Cont. 807 from the ATM switch 103 (shown in FIG. 2) via the SONET interface circuit 811, the ATM matrix 810, and each ATR 809, which are included in the DSLAM 102 shown in FIG. 9.

Upon receipt of the idle VC indication cell, the SVC Cont. 807 extracts the VPI/VCI of the idle ATM VC stored in the information field of the cell, and registers the extracted VPI/VCI to a nominated VC map possessed by the SVC Cont. 807.

The nominated VC map stores not only the information about an idle ATM VC but also the information about the ATM VC used by the port to which the map itself currently belongs.

FIG. 12 shows the data structure of the nominated VC map.

This map stores, for each ATM VC, the port number (NW Port #) of the SONET interface circuit 811 of the DSLAM 102 to which an ATM VC belongs, an STS channel number (STS CH#) configuring the SONET interface at which the SONET interface circuit 811 terminates, the VPI (VPI #)/VCI (VCI #) of the ATM VC, an ATM address of the access server 104 to which the ATM VC belongs, an identifier (ISP ID) of the ISP (Internet Service Provider) that manages the access server 104, and the current use status (Status) of the ATM VC. A plurality of PCs 106 can be connected to the subscriber line accommodated by the port to which this map belongs via the modem 101, and each of the PCs 106 can individually establish a PPP session with the access server 104. Therefore, one ATM address corresponding to one access server 104 may be assigned to the entries of a plurality of ATM VCs in the above described map.

The SVC Cont. 807 within the port corresponding to each subscriber line within the DSLAM 102 can continuously identify which ATM VC is not used for each access server 104 by referencing the nominated VC map possessed by the SVC Cont. 807. Therefore, a subscriber call can be connected to an idle ATM VC within the PVC corresponding to the access server 104 which is a connection destination without confirming an external network management system or an upstream device, with the following procedures.

Figure 13:
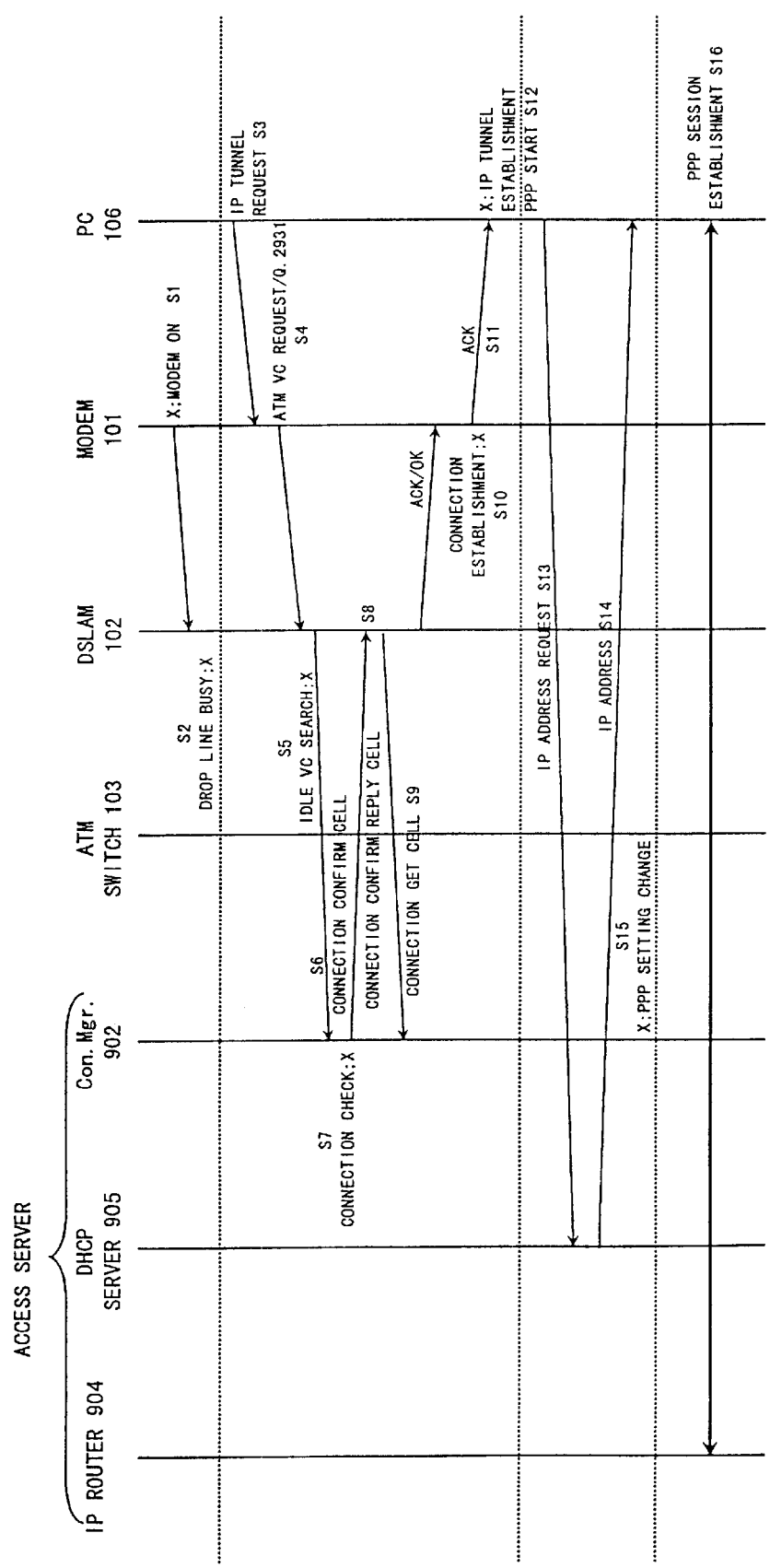
FIG. 13 shows the sequence for establishing an end-to-end connection.

FIG. 13 shows the sequence for establishing an end-to-end connection.

The operations for powering up the port on the DSLAM 102 side when the modem 101 is powered up are the same as those described above (S1 and S2 of FIG. 13).

Next, an IP tunnel request is issued from the PC 106 (shown in FIG. 2) to the modem 101 (S3 of FIG. 13).

The details of the IP tunnel request are illustrated in the sequence of FIG. 14. The following sequence is based on a PPTP. However, the sequence based on an L2TP is similar to this sequence.

First of all, the PNS 702 within the PC 106 issues a start control connection request to the PAC 703 (shown in FIG. 8) within the modem 101 (S3-1 of FIG. 14). This request is a PPTP control message for establishing a control connection between the PNS 702 and the PAC 703, and has the structure shown in FIG. 15.

Figure 15:
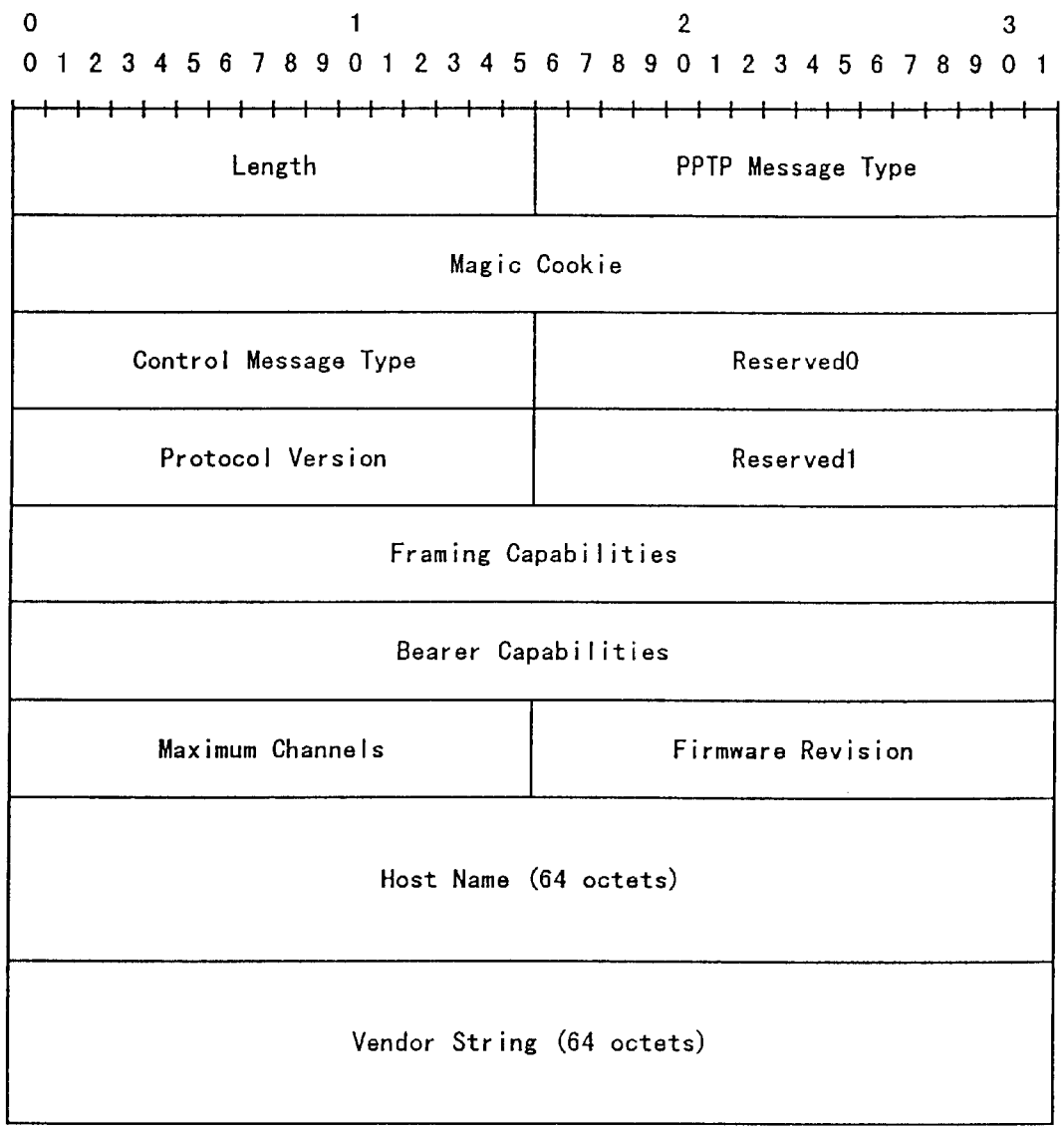
FIG. 15 shows the data format of a start control connection request.

In FIG. 15, "Length" is the total data length of the start control connection request. "PPTP Message Type" is set to the value "1" indicating the control message. "Magic Cookie" is assigned with the code for checking validity. "Control Message Type" is assigned with the value "1" indicating the start control connection request. All the bits of "Reserved0" and "Reserved1" are set to "0". "Protocol Version" is assigned with the PPTP version requested by a transmitting side. "Framing Capabilities" is assigned with a frame type that the transmitting side can provide. "1" is assigned for asynchronous framing, while "2" is assigned for synchronous framing. "Bearer Capabilities" is assigned with the bearer capability that the transmitting side can provide. "1" is assigned for an analog access support, while "2" is assigned for a digital access support. "Maximum Channels" is assigned with the number of PPP sessions that the PAC 703 can support. Since this field is assigned by the PAC 703, all the bits of this field are set to "0".

"Firmware Revision" is assigned with the firmware version number of the PNS 702. "Host Name" is assigned with the host name of the PNS 702. This host name can be identified by a DNS (Domain Name System). "Vendor String" is assigned with the vendor name of the PNS 702.

Upon receipt of the above described start control connection request, the PAC 703 returns a start control connection reply to the PNS 702 within the PC 106, which transmitted the start control connection request (S3-2 of FIG. 14). This reply is also a PPTP control message, and has the structure shown in FIG. 16.

The data structure shown in FIG. 16 resembles the data structure shown in FIG. 15. However, "Control Message Type" is assigned with the value "2" indicating the start control connection reply. Additionally, "Result Code" is assigned with "1" when a channel is successfully established, "2" when a general error occurs, "3" when a command channel currently exists, "4" when the request has no authority for establishing a command channel, and "5" when the protocol version of the request is not supported. Furthermore, the details of a problem are displayed only when a general error occurs. "Maximum Channels" is assigned with the number of PPP sessions that the PAC 703 can support. "Host Name" is assigned with the DNS host name of the PAC 703.

Upon receipt of the start control connection reply, the PNS 702 within the PC 106 transmits "SetLinkInfo" (S3-3). The "SetLinkInfo" is a PPTP control message transmitted for setting a PPP-arbitrated option, and has the structure shown in FIG. 17.

Figure 17:
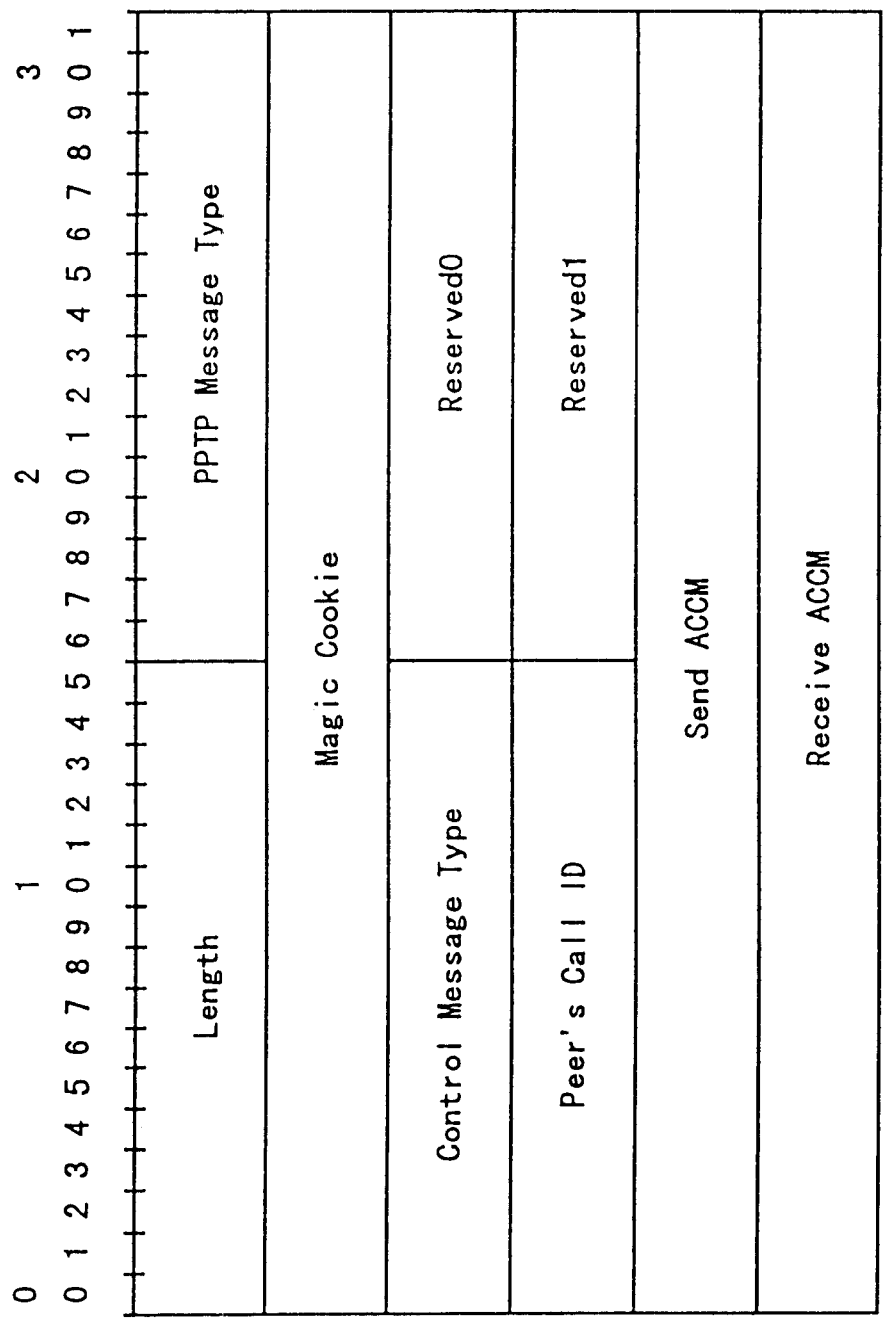
FIG. 17 shows the data format of SetLinkInfo.

In FIG. 17, "Length" is the total data length of the "SetLinkInfo". "PPTP Message Type" is set to "1" indicating the control message. "Magic Cookie" is assigned with the code for checking validity. "Control Message Type" is set to the value "15" indicating the "SetLinkInfo". All the bits of "Reserved0" and "Reserved1" are set to "0". "Peer's Call ID" is assigned with a call identifier that the PAC 703 assigns to this call. "SendACCM" and "ReceiveACCM" are respectively assigned with an ACCM that a client uses for outgoing and incoming PPP packets.

Then, the PNS 702 within the PC 106 issues an outgoing call request to the PAC 703 within the modem 101 (S3-4). This request is a PPTP control message for requesting the PAC 703 to originate an external call (access server 104). This request includes the information required for originating a call and the information for controlling a data transfer. It has the structure shown in FIG. 18.

Figure 18:
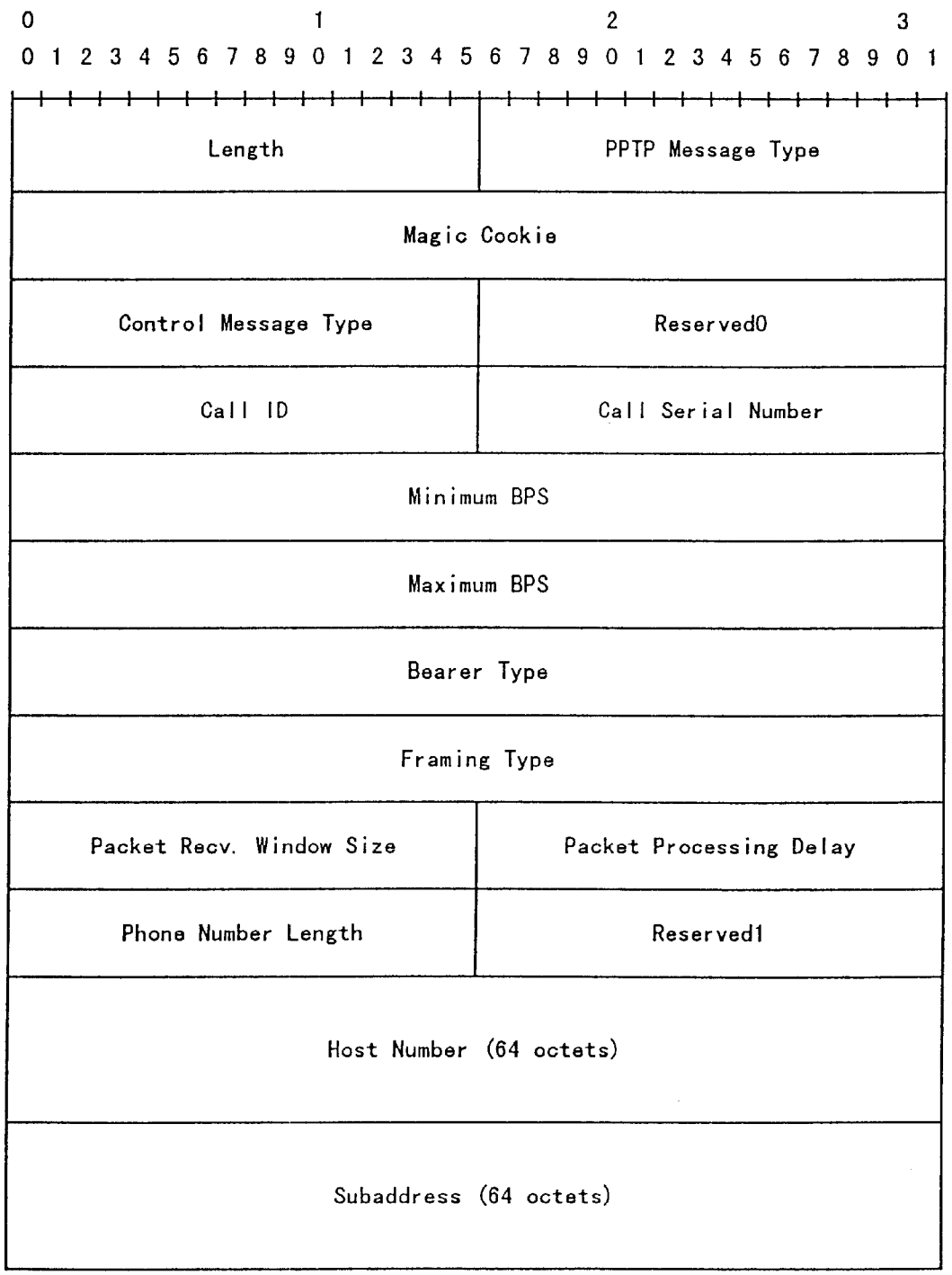
FIG. 18 shows the data format of an outgoing call request.

In FIG. 18, "Length" is the total data length of this request. "PPTP Message Type" is set to the value "1" indicating the control message. "Magic Cookie" is assigned with the code for checking validity. "Control Message Type"

is set to the value "7" indicating the outgoing call. All the bits of "Reserved0" and "Reserved1" are set to "0". "Call ID" is assigned with an identifier for uniquely identifying a pair of the PNS 702 and the PAC 703, that is, an IP tunnel. "Call Serial Number" is assigned with an identifier for identifying this call in log information. "Minimum BPS" and "Maximum BPS" are assigned with minimum and maximum line speeds (bits per second) which are allowable for this session. "Bearer Capabilities" is assigned with a bearer capability required for this outgoing call. "1" is assigned to the call established on an analog channel, while "2" is assigned to the call established on a digital channel. "3" is assigned to a call established on whichever channel. "Framing Type" is assigned with a PPP frame type. "1" is assigned for a call using asynchronous framing, while "2" is assigned for a call using synchronous framing. "Packet Recv. Window Size" is assigned with the number of received data packets that the PNS 702 buffers for this session. "Packet Processing Delay" is assigned with the duration of a packet processing delay extension of the data to be transmitted from the PAC 703 to the PNS 702 in units of one-tenth of a second. "Phone Number Length" is assigned with the number of digits of a telephone number in a "Phone Number" field. "Phone Number" and "Subaddress" are assigned with the ATM address of the access server 104.

Upon receipt of the above described outgoing call request from the PC 106, the PPTP controller 705 (shown in FIG. 8) which corresponds to the above described call and is included in the PAC 703 within the modem 101 passes to the Q.2931 processor 709 the "Phone Number" and the "Subaddress" of the access server 104, which are extracted from the outgoing call request, and passes to the IP tunnel ATM VC negotiator 707 the "Minimum BPS" and the "Maximum BPS", which are extracted from the request.

The IP tunnel/ATM VC negotiator 707 shown in FIG. 8 performs the following control operations in order to prevent a congestion occurring on an xDSL line which is UBR (Unspecified Bit Rate) controlled. That is, the IP tunnel/ATM VC negotiator 707 converts the minimum BPS and the maximum BPS that the above described IP tunnel request requires into a minimum cell rate and a maximum cell rate, respectively, which are parameters of an ATM VC, and compares the converted rates with the bandwidth of the XDSL line and the currently unused bandwidth, which are received from the resource manager 708. As a result of the comparison, if the values of the IP tunnel request are unsuitable, the IP tunnel/ATM VC negotiator, 707 requests the PPTP controller 705 to change these values.

When the "Phone Number" and the "Subaddress" of the access server 104 are passed from the PPTP controller 705, the Q.2931 processor 709 shown in FIG. 8 issues to the DSLAM 102 the ATM VC request where the ATM address of the access server 104 is specified according to the ITU-T Q.2931 signaling procedures (S4 of FIG. 13 or FIG. 14).

This ATM VC request is converted into an ATM cell for UNI (User Network Interface) signaling in the SAR 710 shown in FIG. 8, and is transmitted to a subscriber line which is an xDSL line via the cell multiplexing circuit 711 and the xDSL driver 712.

In the DSLAM 102 shown in FIG. 9, upon receipt of the above described ATM VC request via the hybrid circuit 801, the xDSL driver 804, the UPC 808, and the ATR 809, the SVC Cont. 807 searches for an idle VC with the following procedures.

First of all, the SVC Cont. 809 identifies from the ATM VC request the ATM address of the access server 104 which is the connection destination.

The SVC Cont. 807 then searches the ATM VC group including the ATM address of the access server 104 in the nominated VC map (refer to FIG. 12), and extracts the entry of an ATM VC whose current use status is unoccupied, that is, an idle ATM VC from the searched group.

When the SVC Cont. 807 successfully extracts the entry of the idle ATM VC, it confirms that the VPI/VCI assigned to the extracted entry is not used by communicating with the Con.Mgr. 902 within the access server 104 which is the connection destination.

Specifically, the SVC Cont. 87 transmits a connection confirm cell which is an OAM cell (S6 of FIG. 13). This OAM cell has the above described data structure shown in FIG. 11. The value "00000002" indicating the connection confirm cell is assigned as the cell type identifier within the payload. Additionally, the ATM address of the access server 104 which is the connection destination, the VPI/VCI of the idle ATM VC, the ATM address of the DSLAM 102, and the port number of the SVC Cont. 807 are stored in the information field.

The above described connection confirm cell is input from the SVC Cont. 807 to the ATM matrix 810 via the ATR 809, copied in the ATM matrix 810, and broadcast from all of the SONET interface circuits 811 as an OAM cell, in FIG. 9.

When the OAM cell reaches the Con.Mgr 902 (refer to FIG. 10) within the access server 104 which is the connection destination, the Con.Mgr. 902 identifies that this OAM cell is the connection confirm cell addressed to the Con.Mgr. 902 itself by recognizing the cell type identifier stored in the payload of the OAM cell and the ATM address of its own stored in the information field within the payload.

The Con.Mgr. 902 then determines whether or not the VPI/VCI stored in the information field within the payload of that connection confirm cell are not currently used (S7 of FIG. 13).

If the Con.Mgr. 902 determines that the VPI/VCI are currently unused, it transmits a connection confirm reply cell which is an OAM cell (S8 of FIG. 13). This OAM cell has the above described data structure shown in FIG. 11, and the value "00000003" indicating the connection confirm reply cell is assigned as the cell type identifier within the payload. The contents of the information field of the above described connection confirm cell are stored in the information field unchanged.

This connection confirm reply cell is broadcast as the OAM cell from the Con.Mgr. 902 via the SONET interface circuit 901 in FIG. 10 (S8 of FIG. 13).

When this OAM cell reaches the DSLAM 102 which is the connection destination, it is transferred from the SONET interface circuit 811 to the ATM matrix 810, copied, and broadcast to the ATRs 809 within all of the ports shown in FIG. 9.

Upon receipt of the OAM cell via the ATR 809, the SVC Cont. 807 which transmitted the connection confirm cell identifies that this OAM cell is the connection confirm reply cell addressed to the SVC Cont. 807 itself by recognizing the cell type identifier stored in the payload of the OAM cell and its own ATM address stored in the information field within the payload.

Upon receipt of the connection confirm reply cell, the SVC Cont. 807 transmits a connection get cell which is an OAM cell to the access server 104 which is the connection destination (S9 of FIG. 13). This OAM cell has the above described data structure shown in FIG. 11. The value "00000004" indicating the connection get cell is assigned as the cell type identifier within the payload. The ATM address of the access server 104 which is the connection destination, the VPI/VCI of the idle ATM VC, the ATM address of the DSLAM 102, and the port number of the SVC Cont. 807 are stored in the information field.

Additionally, the SVC Cont. 807 changes the use status of the corresponding entry in the nominated VC map to the occupied status on a predetermined cycle.

Furthermore, the SVC Cont. 807 controls the ATM matrix 810, and connects the SONET interface circuit 811 which can reach the access server 104 which is a connection destination, and the ATR 809 to which the above described SVC Cont. 807 is connected for the ATM cell with the obtained VPI/VCI of the ATM VC.

The above described connection get cell is received and identified by the Con.Mgr. 902 within the access server 104 which is the connection destination in a similar manner as in the case of the connection confirm cell.

Thereafter, the Con.Mgr. 902 does not transmit an idle VC indication cell for the VPI/VCI specified as the connection get cell.

Upon receipt of the connection confirm reply cell, the SVC Cont. 807 first notifies the modem 101 that issued the ATM VC request of a local VPI/VCI along with the establishment of the connection with the Q.2931 signaling procedures (S10 of FIG. 13 or 14).

Simultaneously, the SVC Cont. 807 maps the local VPI/VCI and the VPI/VCI of the idle ATM VC identified for the access server in the table within the ATR 809. As a result, the modem 101 and the access server 104 are connected.

In FIG. 8, upon receipt of the above described notification from the DSLAM 102, the Q.2931 processor 709 within the modem 101 notifies the PPTP controller 705 via the IP tunnel/ATM VC negotiator 707 that the connection is made.

As a result, the PPTP controller 705 returns an outgoing call reply to the PNS 702 within the PC 106 (S11 of FIG. 13 or 14). This reply is a PPTP control message similar to an outgoing call request, and has the structure shown in FIG. 19.

Specifically, the PPTP controller 705 sets the arbitration result of the line speed request value notified from the IP tunnel/ATM VC negotiator 707 to "Connect Speed".

Figure 19:
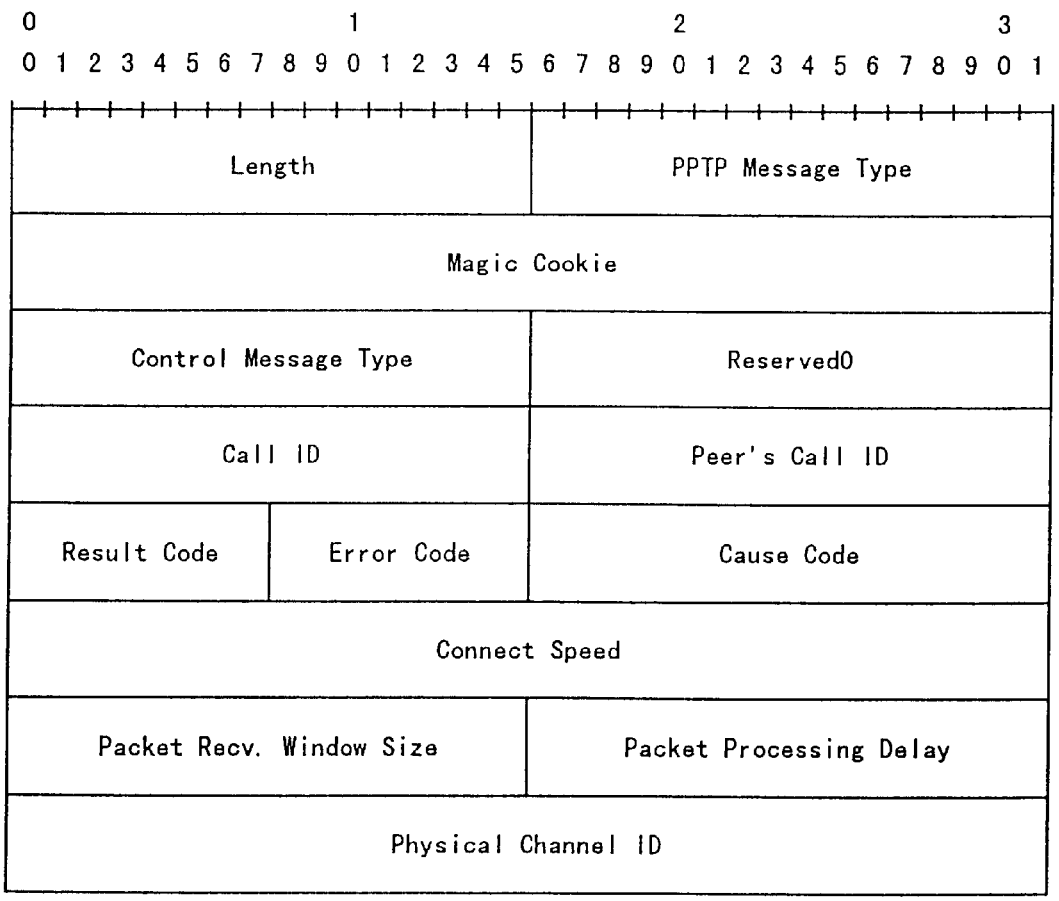
FIG. 19 shows the data format of an outgoing call reply.

In FIG. 19, "Control Message Type" is set to the value "8" indicating the outgoing call reply. "Call ID" is assigned with the identifier for uniquely identifying a pair of the PNS 702 and the PAC 703, that, is an IP tunnel. "Peer's Call ID" is set to the same value as that of the "Call ID" (refer to FIG. 18) set to the outgoing call request. "Result Code" is assigned with the result of the outgoing call request. Namely, "1" is assigned when a call is established. "2" is assigned when a general error occurs. "3" is assigned when no carrier is extracted. "4" is assigned when a line is busy. "5" is assigned when there is no dial tone. "6" is assigned when a timeout occurs. "7" is assigned when a call is rejected. Additionally, the details of a problem are displayed only when a general error occurs. "Cause Code" is assigned with a further detailed cause code. "Connect Speed" is assigned with a line speed which is an arbitration result from the IP tunnel/ATM VC negotiator 707, as described above. "Packet Recv. Window Size" is assigned with the number of received data packets that the PNS 702 buffers for this session. "Packet Processing Delay" is assigned with a packet processing delay extension for the data transmitted from the PAC 703 to the PNS 702 in units of one-tenth of a second. "Physical Channel ID" is information depending on a vendor, and is "don't care" in this specification.

The PNS 702 within the PC 106 receives the above described outgoing call reply, so that an IP tunnel is established and a PPP communication is started (S12 of FIG. 13).

Then, an IP address request is transmitted from the PC 106 to the DHCP server 905 within the access server 104 which is the connection destination (S13 of FIG. 13), and an IP address is assigned from the DHCP server 905 to the PC 106 in response to this request. At this time, the Con.Mgr. 902 changes the PPP setting (S15 of FIG. 13).

In this way, a PPP session is established between the PC 106 and the IP router 904 within the access server 104 (S16 of FIG. 13). Thereafter, it becomes possible to access the Internet 105 with the above described IP address.

The access server 104 includes the correspondence table between a PPP session ID and the VPI/VCI of an ATM VC which transfers a PPP packet.

FIGS. 20 and 21 show the lists of OAM cells which are used or can be possibly used in the preferred embodiment according to the present invention, and explain the respective OAM cells.

<Details of Line Termination Procedures>

Provided first is the explanation about the operations when a line terminating request is received from the modem 101.

At first, the SVC Cont. 807 within the DSLAM 102 receives a call terminating request conforming to the Q.2931 signaling procedures from an opposing modem 101.

The SVC Cont. 807 cancels the mapping of the corresponding VPI/VCI in the ATR 809 according to the call terminating request.

Additionally, the SVC Cont. 807 restores the use status of the entry corresponding to the VPI/VCI to the unoccupied status in the nominated VC map on a predetermined cycle.

Furthermore, the SVC Cont. 807 transmits a connection release cell which is an OAM cell. This OAM cell has the above described data structure shown in FIG. 11. The value "00000005" indicating the connection confirm cell is assigned as the cell type identifier of the payload. The ATM address of the access server 104 which is a connection destination, the VPI/VCI of the ATM VC corresponding to the call terminating request, the ATM address of the DSLAM 102, and the port number of the SVC Cont. 807 are stored in the information field.

The above described connection release cell is input from the SVC Cont. 807 to the ATM matrix 810 via the ATR 809, copied, and broadcast as th e OAM cell from all of the SONET interface circuits 811, in FIG. 8.

When the OAM cell reaches the Con.Mgr. 902 (refer to FIG. 10) within the access server 104 which is the connection destination, the Con.Mgr. 902 identifies that this OAM cell is a connection release cell addressed to the Con.Mgr. 902 itself by recognizing the cell type identifier stored in the payload of the OAM cell and its own ATM address stored in the information field within the payload.

The Con.Mgr. 902 then resumes the transmission of the idle VC indication cell for the VPI/VCI stored in the information field within the payload of the connection release cell.

<Call Termination Process Due to Power-Off of the Modem 101>

For example, if the power of the modem 101 is shut off, an xDSL line is terminated from a subscriber side without the issuance of the call terminating request. If this state is left unattended, this call will remain without being released.

Therefore, according to the present invention, when the frequency detector 802 detects the discontinuity of an upstream on a subscriber line after an xDSL line is started up, the power controller 803 connected to the frequency detector 802 can be configured to perform the above described call termination process for the SVC Cont. 807 immediately before the xDSL driver 804 and the SVC Cont. 807, which are connected to the power controller 803, are powered down.

<Call Termination Process Due to an IP Tunnel Disconnection>

For example, if the power of the PC 106 is shut off, a line is terminated without the termination of an IP tunnel. If this state is left unattended, this call remains without being released as long as the power of the modem 101 is ON.

Therefore, according to the present invention, it can be configured that the PPTP controller 705 detects the disconnection of an IP tunnel, for example, by detecting the discontinuity of an echo message based on the PPTP, and the Q.2931 processor 709 issues a call terminating request when the disconnection is detected, in the modem 101 shown in FIG. 8.

<Prevention of Improper Operations for Establishing an ATM VC Performed by the SVC Cont. 807 and the Con. Mgr. 902>

According to the above described preferred embodiment of the present invention, the idle VC indication cell is configured to be transmitted at regular time intervals (such as at 5-minute intervals) from the Con.Mgr. 902 in order to prevent network resources from being wasted, by utilizing transmission of a cell depending on need.

However, the idle VC indication cell may be configured to be continuously transmitted as a method for avoiding a collision. In this case, there is no need to perform the confirmation procedure using a connection confirm cell and a connection confirm reply cell.

<Incorporating the OAM Cell Termination Capability into a Network Interface Device>

If DSLAMs 102 are connected as a ring, an OAM cell must be configured not to return to an original DSLAM 102.

In this case, the OAM cell termination capability may be incorporated into a network interface device such as a SONET interface circuit, etc. as an option.

<Method for Automatically Setting a Nominated VC Map>

The SVC Cont. 807 can extract the ATM address of the ISP to which an idle ATM VC is allocated, by storing the ATM address of the access server 104 that transmitted an idle indication cell in the payload of the cell, and can add the nominated VC map of the SVC Cont. 807 itself based on this data.

What is claimed is:

1. An SVC accessing method for use in an ATM-DSLAM, with which a subscriber side terminating device accesses an access server connected to a cell switch network by using a fixed-length cell via an accommodation station side terminating device accommodating a subscriber line to which the subscriber side terminating device is connected, comprising:

continuously connecting the access server and the accommodation station terminating device with a permanent virtual connection;

managing an unused virtual connection within the permanent virtual connection in the access server and the accommodation station side terminating device;

allocating an unused virtual connection to the subscriber side terminating device by communicating with the access server based on a call originating request issued from the subscriber side terminating device, in the accommodation station side terminating device;

managing an unused virtual connection within the permanent virtual connection while exchanging information about the unused virtual connection by using a management and maintenance broadcast cell at predetermined time intervals, in the access server and the accommodation station side terminating device; and allocating an unused virtual connection to the subscriber side terminating device by communicating with the access server by using a management and maintenance broadcast cell based on the call originating request issued from the subscriber side terminating device, in the accommodation station side terminating device.

2. The SVC accessing method according to claim 1, further comprising:

storing identification information of the access server along with information about the unused virtual connection in the management and maintenance broadcast cell.

3. The SVC accessing method according to claim 1, further comprising:

releasing a virtual connection under a communication by communicating with the access server with a management and maintenance broadcast cell based on a call terminating request issued from the subscriber side terminating device, in the accommodation station side terminating device.

4. An SVC accessing method for use in an ATM-DSLAM, with which a subscriber side modem which performs modulation/demodulation with a digital subscriber line method accesses an access server connected to an ATM switch network by using an ATM cell transferred with an asynchronous transfer mode method via an accommodation station side modem accommodating a digital subscriber line to which the subscriber side modem is connected, comprising:

continuously connecting the access server and the accommodation station side modem with a permanent virtual connection;

managing an unused virtual connection within the permanent virtual connection in the access server and the accommodation station side modem;

allocating an unused virtual connection to the subscriber side modem by communicating with the access server based on a call originating request issued from the subscriber side modem, in the accommodation station side modem;

managing an unused virtual connection within the permanent virtual connection while exchanging information about the unused virtual connection by using a management and maintenance broadcast cell, in the access server and the accommodation station side modem; and allocating an unused virtual connection to the subscriber side modem by communicating with the access server with a management and maintenance broadcast cell based on the call originating request issued from the subscriber side modem, in the accommodation station modem.

5. The SVC accessing method according to claim 4, further comprising:

selectively running a capability for terminating the management and maintenance broadcast cell input from a network side in an accommodation station side network interface.

6. The SVC accessing method according to claim 4, further comprising:

storing identification information of the access server along with information about the unused virtual connection in the management and maintenance broadcast cell.

7. The SVC accessing method according to claim 6, further comprising:

selectively running a capability for terminating the management and maintenance broadcast cell input from a network side in an accommodation station side network interface.

8. The SVC accessing method according to claim 4, further comprising:

releasing a virtual connection under a communication by communicating with the access server with a management and maintenance broadcast cell based on a call terminating request issued from the subscriber side modem, in the accommodation station side modem.

9. An ATM-DSLAM device, which is an accommodation station side modem, for use in a system where a subscriber side modem performing modulation/demodulation with a digital subscriber line method accesses an access server connected to an ATM switch network by using an ATM cell transferred with an asynchronous transfer mode method via the accommodation station side modem accommodating a digital subscriber line to which the subscriber side modem is connected, comprising:

a connecting device for making a continuous connection with the access server by using a permanent virtual connection;

a connection managing device for managing an unused virtual connection within the permanent virtual connection; and a connection allocating device for allocating an unused virtual connection to the subscriber side modem by communicating with the access server based on a call originating request issued from the subscriber side modem; wherein said connection managing device manages an unused virtual connection within the permanent virtual connection while exchanging with the access server information about the unused virtual connection by using a management and maintenance broadcast cell; and said connection allocating device allocates an unused virtual connection to the subscriber side modem by communicating with the access server with a management and maintenance broadcast cell based on a call originating request issued from the subscriber side modem.

10. The ATM-DSLAM device according to claim 9, further comprising:

a network interface for selectively performing a capability for terminating the management and maintenance broadcast cell input from a network side.

11. The ATM-DSLAM device according to claim 9, wherein identification information of the access server is stored in the management and maintenance broadcast cell along with information about the unused virtual connection.

12. The ATM-DSLAM device according to claim 9, wherein said connection allocating device releases a virtual connection under a communication by communicating with the access server with the management and maintenance broadcast cell based on a call terminating request issued from the subscriber side modem.

13. An ATM access server module which is an access server for use in a system where a subscriber side modem performing modulation/demodulation with a digital subscriber line method accesses the access server connected to an ATM switch network by using an ATM cell transferred with an asynchronous transfer mode method via an accommodation station side modem accommodating a digital subscriber line to which the subscriber side modem is connected, comprising:

a connecting device for making a continuous connection with the accommodation station side modem by using a permanent virtual connection; and a connection managing device for managing an unused virtual connection within the permanent virtual connection; wherein said connection managing device manages the unused virtual connection within the permanent virtual connection while exchanging with the accommodation station side modem information about the unused virtual connection by using a management and maintenance broadcast cell, and wherein an unused virtual connection is allocated to the subscriber side modem through communication with the accommodation station side modem with a management and maintenance broadcast cell based on a call originating request issued from the subscriber side modem.

14. An ATM modem which is a subscriber side modem for use in a system where the subscriber side modem performing modulation/demodulation with a digital subscriber line method accesses an access server connected to an ATM switch network by using an ATM cell transferred with an asynchronous transfer mode method via an accommodation station side modem accommodating a digital subscriber line to which the subscriber side modem is connected, and the accommodation station side modem continuously connected with the access server by using a permanent virtual connection and managing an unused virtual connection within the permanent virtual connection, comprising:

a connection allocation receiving device for receiving an allocation of an unused virtual connection, within the permanent virtual connection, from the accommodation station side modem by issuing a call originating request to the accommodation station side modem; wherein said connection allocating receiving device allocates an unused virtual connection to the subscriber side modem by communicating with the access server with a management and maintenance broadcast cell based on a call originating request issued from the subscriber side modem.

* * * * *